(12) United States Patent
Arai et al.

(10) Patent No.: US 6,421,461 B1
(45) Date of Patent: *Jul. 16, 2002

(54) PATTERN RECOGNITION APPARATUS WHICH COMPARES INPUT PATTERN FEATURE AND SIZE DATA TO REGISTERED FEATURE AND SIZE PATTERN DATA, AN APPARATUS FOR REGISTERING FEATURE AND SIZE DATA, AND CORRESPONDING METHODS AND MEMORY MEDIA THEREFOR

(75) Inventors: Tsunekazu Arai, Tama; Eiji Takasu, Yokohama; Hiroto Yoshii, Tokyo, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/718,233

(22) Filed: Sep. 20, 1996

(30) Foreign Application Priority Data

Sep. 21, 1995 (JP) .............................................. 7-242830

(51) Int. Cl.⁷ ................................................ G06K 9/00
(52) U.S. Cl. ........................ 382/187; 382/201; 382/203; 382/292
(58) Field of Search ................................. 382/186, 187, 382/227, 188, 209, 189, 201–203, 177, 313, 170, 314, 315, 229, 156, 192, 195, 218, 291–292; 345/467, 471, 441

(56) References Cited

U.S. PATENT DOCUMENTS

| | | | | |
|---|---|---|---|---|
| 4,491,965 A | * | 1/1985 | Yoshimura | 382/177 |
| 5,048,097 A | * | 9/1991 | Gaborski et al. | 382/156 |
| 5,182,777 A | * | 1/1993 | Nakayama et al. | 382/170 |
| 5,410,612 A | | 4/1995 | Arai et al. | 382/187 |
| 5,513,278 A | * | 4/1996 | Hashizume et al. | 382/187 |
| 5,579,408 A | | 11/1996 | Sakaguchi et al. | 382/187 |
| 5,675,665 A | * | 10/1997 | Lyon | 382/229 |
| 5,687,253 A | * | 11/1997 | Huttenlocher et al. | 382/177 |
| 5,729,630 A | * | 3/1998 | Ikeda | 382/229 |
| 5,812,696 A | * | 9/1998 | Arai et al. | 382/185 |
| 5,835,631 A | * | 11/1998 | Mori et al. | 382/181 |

* cited by examiner

Primary Examiner—Leo Boudreau
Assistant Examiner—Ishrat Sherali
(74) Attorney, Agent, or Firm—Fitzpatrick, Cella, Harper & Scinto

(57) ABSTRACT

A pattern recognition system which includes an input device for inputting a pattern and a character code, an extractor for extracting feature data from the input pattern, a detector for detecting size data of the input pattern, and a register for registering both the features data and the size data in correspondence with the input character code to a dictionary for character recognition.

38 Claims, 24 Drawing Sheets

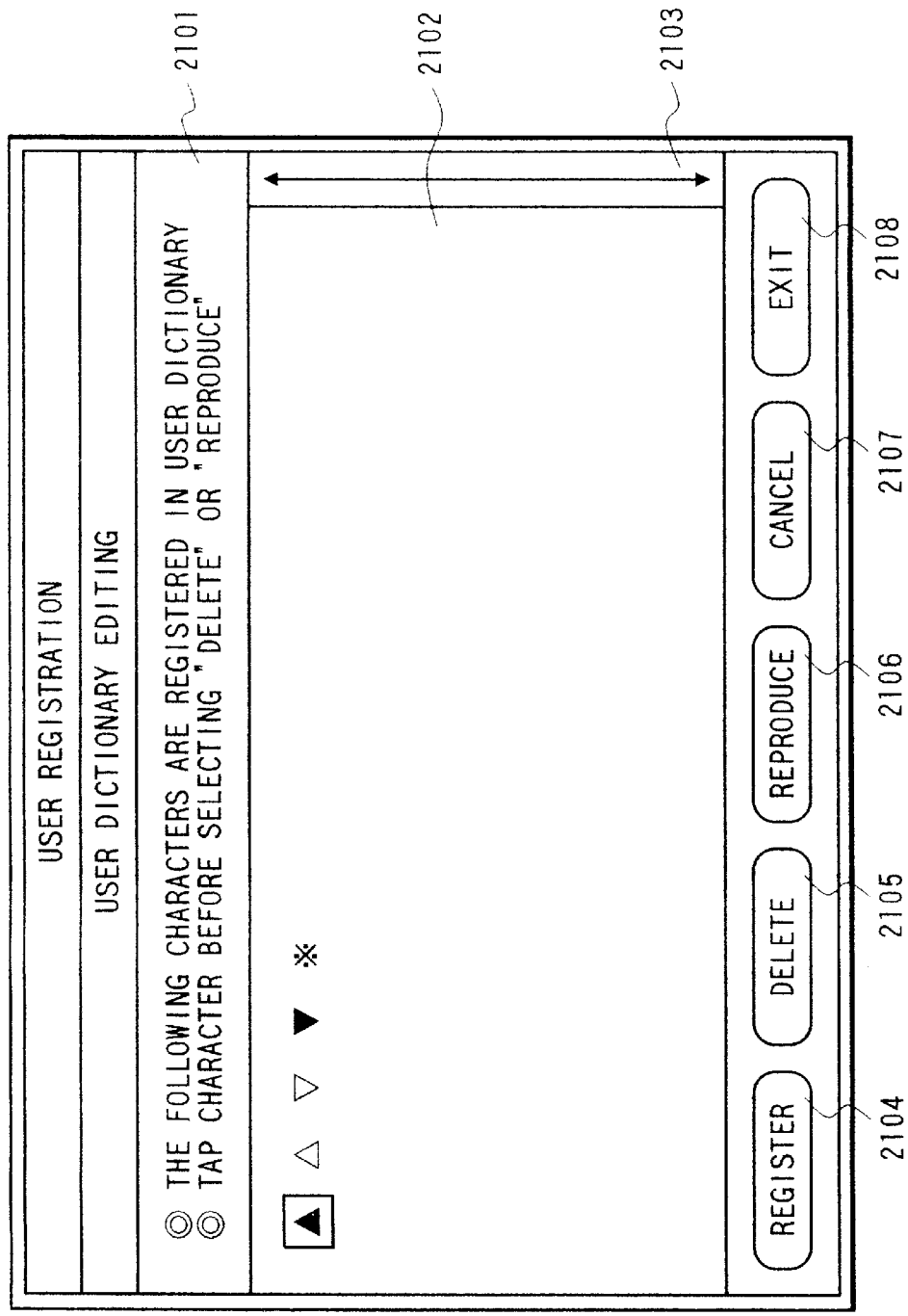

FIG. 24

| REGISTRATION NO. _2401 | CHARACTER CODE _2402 | RELATIVE SIZE _2403 | NORMALIZED HANDWRITING DATA _2404 |
|---|---|---|---|
| 001 | 2225 | 90% | TRIANGLE |
| 002 | 2224 | 50% | TRIANGLE |
| 003 | 2226 | | |
| 004 | 2227 | | |
| 005 | 2228 | | |

FIG. 28

| REGISTRATION NO. _2801 | CHARACTER CODE _2802 | POSITION & SIZE _2803 | NORMALIZED HANDWRITING DATA _2804 |
|---|---|---|---|
| 003 | 3E65, 4267 | (5, 5, 90, 6) | LATERAL LINE |
| 004 | 4366, 3E2E | (30, 50, 60, 50) | LATERAL LINE |
| 005 | 323C, 3126 | (50, 90, 90, 90) | LATERAL LINE |
| ⋮ | ⋮ | ⋮ | ⋮ |
| | | | |

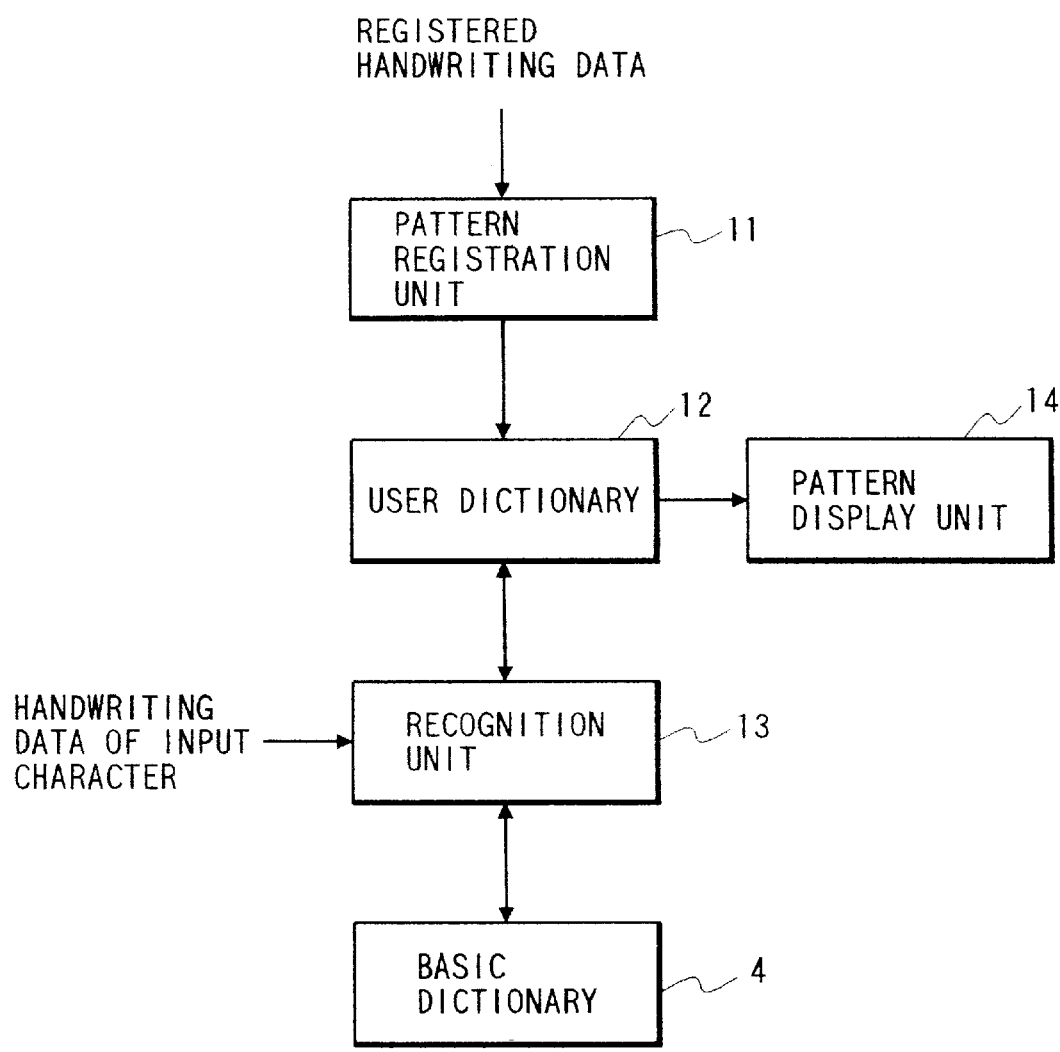

PATTERN RECOGNITION APPARATUS WHICH COMPARES INPUT PATTERN FEATURE AND SIZE DATA TO REGISTERED FEATURE AND SIZE PATTERN DATA, AN APPARATUS FOR REGISTERING FEATURE AND SIZE DATA, AND CORRESPONDING METHODS AND MEMORY MEDIA THEREFOR

BACKGROUND OF THE INVENTION

1. Field of the Invention

The present invention relates to an information processing apparatus, and a method and a memory medium therefor, and more particularly to an information processing apparatus adapted to recognize handwritten information such as a handwritten character and to generate a character symbol as the result of recognition, and a method and a memory medium therefor.

2. Related Background Art

The conventional character recognition apparatus is composed of handwritten pattern registration means for effecting feature extraction based on normalized handwritten data from which the information on the size and position of the character is lost, a user registered dictionary registering character codes corresponding to feature data, extracted by the handwritten pattern registration means, without the size and position information of the character, and recognition means utilizing the user registration dictionary.

In such conventional apparatus, however, the information on the size and position of the handwriting at the character registration is lost at the registering operation, so that the user registered dictionary does not contain such information on the size or position of the character. Therefore, the information on the size and the position is not available at the recognition process. Consequently, if the user registers handwritings with different positions or sizes and effects the subsequent input operation in consideration of such different positions or sizes, such handwritings are considered same in the recognition process and cannot be mutually distinguished.

SUMMARY OF THE INVENTION

In order to resolve the above-mentioned drawback of the prior art, the present invention is to utilize a dictionary which stores the feature amount of the handwriting information, the size information of the handwriting information and the character symbol to be outputted, in mutual correspondence, to detect the information on the feature amount and size of the entered handwriting information and to search and output a character symbol utilizing thus detected information and the above-mentioned dictionary.

The above-explained configuration provides an advantage of releasing character symbols corresponding to handwritings that are almost same but different in size, and realizing, for example in case of character recognition, handwritten character recognition easy to use for the user.

Preferably there is also provided means for registering, in the above-mentioned dictionary, the feature amount based on the handwriting information, the size information of the handwriting information and the character symbol to be outputted, in mutual correspondence. It is thus rendered possible for the user to register his own handwriting and the character symbol to be outputted.

Also the above-mentioned dictionary preferably contains also the position information of the handwriting information, and can be searched by the feature amount, size and position of the entered handwriting information to obtain the corresponding character symbol to be outputted. In this manner it is rendered possible to assign plural output character symbols to a substantially same handwriting.

The above-mentioned size of the handwriting information is preferably represented by the area ratio of a circumscribed rectangle of the handwritten pattern to the entire area of a predetermined input frame in which the handwriting is to be entered. In this manner the size of the entered handwriting can be evaluated objectively, and there can be obtained an output correctly reflecting the intention of the user.

BRIEF DESCRIPTION OF THE DRAWINGS

FIG. 22 is a view showing an example of the user dictionary editing window in an embodiment of the present invention;

FIG. 24 is a view showing the data structure of the user registered dictionary in the first embodiment;

FIG. 26 is a block diagram showing the principal parts of a second embodiment of the present invention;

FIG. 28 is a view showing the data structure of the user registered dictionary in the second embodiment;

DESCRIPTION OF THE PREFERRED EMBODIMENTS

First Embodiment

Now the present invention will be clarified in detail by an embodiment thereof, with reference to the attached drawings.

Figure 1:
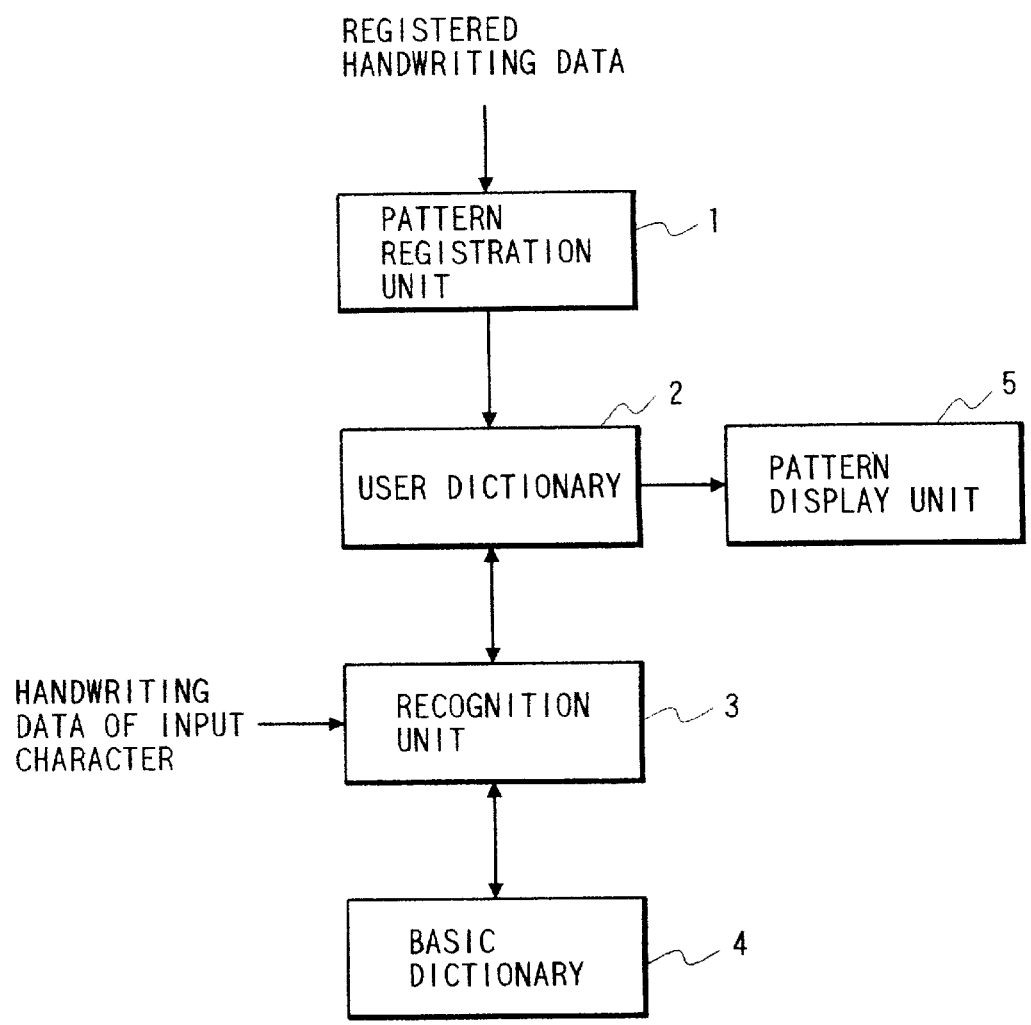
FIG. 1 is a block diagram of principal parts of a first embodiment of the present invention.

FIG. 1 is a block diagram showing the configuration of a user registered character recognition process, featuring the present invention.

Figure 2:
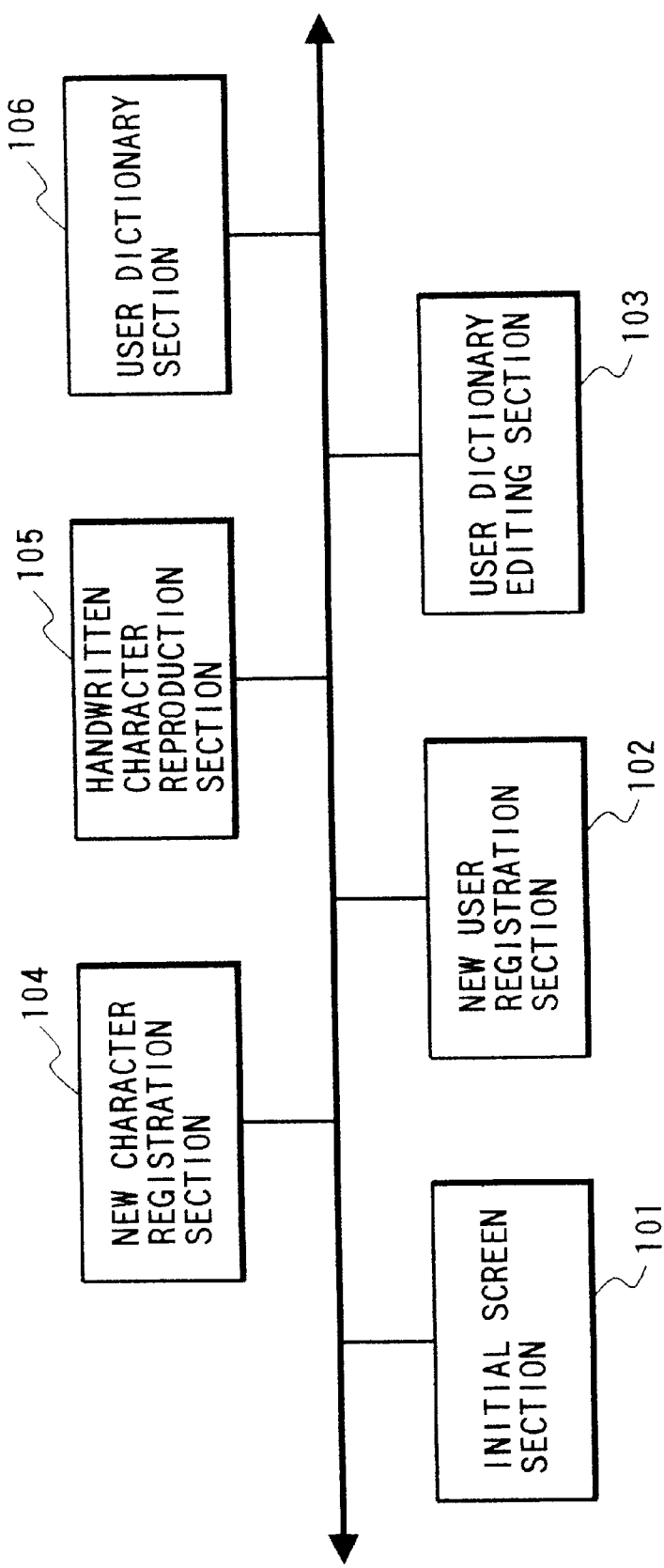
FIG. 2 is a block diagram of a user registration recognition unit in the first embodiment.

In FIG. 1, a recognized pattern registration unit 1 is present, in FIG. 2, in a new character registration section 104, and is adapted to normalize input handwriting data for the data preparation for a recognition dictionary, to extract feature points etc. of the character and to store the same in the user dictionary, as already known in the prior art. In addition, in the present embodiment, it determines the size information of the handwriting entered by the user as size data relative to a character input frame at the registration and stores the size information in the user dictionary 2 in FIG. 1.

The information registered in the user registered dictionary, for a character, consists of handwriting data of normalized strokes, a size of the handwriting data relative to the character input frame, and a character code. The handwriting data consist of representative point data of the handwriting to be used by recognition means 3, and handwriting reproduction data to be used by display means 5.

The recognition means 3 executes recognition utilizing a user registered dictionary, registered by user registration means 3, and a basic dictionary 4. The recognition method is based on a conventional algorithm utilizing, for example, the positional differences among the representative points of the strokes, but the present embodiment obtains the result of recognition also in consideration of the relative size information. The basic dictionary 4 stores in advance character data registered in standard writings.

FIG. 2 is a block diagram showing the configuration of a user registered application in the embodiment of the present invention, wherein sections 101 to 106 respectively serve for the functional elements in the user registration in the on-line character recognition, and consists of a window application execution unit by GUI (graphical user interface) and a user dictionary unit. As one of the features of the present invention, a handwritten character reproduction section 105 reproduces the size of the registered handwriting.

In the following there will be explained the entire actual process of the user registration. An initial screen section 101 displays a list of the registered users, enabling confirmation of the owner of the currently set user dictionary. It also has functions for instructing shifts to a mode of registering a new user (mode of preparing a new user dictionary) and to a mode of editing the characters registered in the user dictionary. A new user registration section 102 executes the above-mentioned registration of the new user. A user dictionary editing section 103 displays a list of the characters in the user dictionary, allowing to instruct the deletion or the reproduction of handwriting for each character. It also has a function for instructing the registration of a handwritten character of the user. A new character registration section 104 executes the character registration instructed by the user dictionary editing section 103. A handwritten character reproduction unit 105 reproduces, in the order of writing, the registered character designated by the user dictionary editing section 103. A user dictionary section 106 stores the registered character information, for realizing the above-mentioned functions. In the present embodiment, it is assumed that plural users have respectively different user dictionaries. In using the present apparatus, the user specifies a user dictionary, for example by entering an ID code, and executes the character recognition and character registration, utilizing such specified user dictionary and the basic dictionary.

Figure 3:
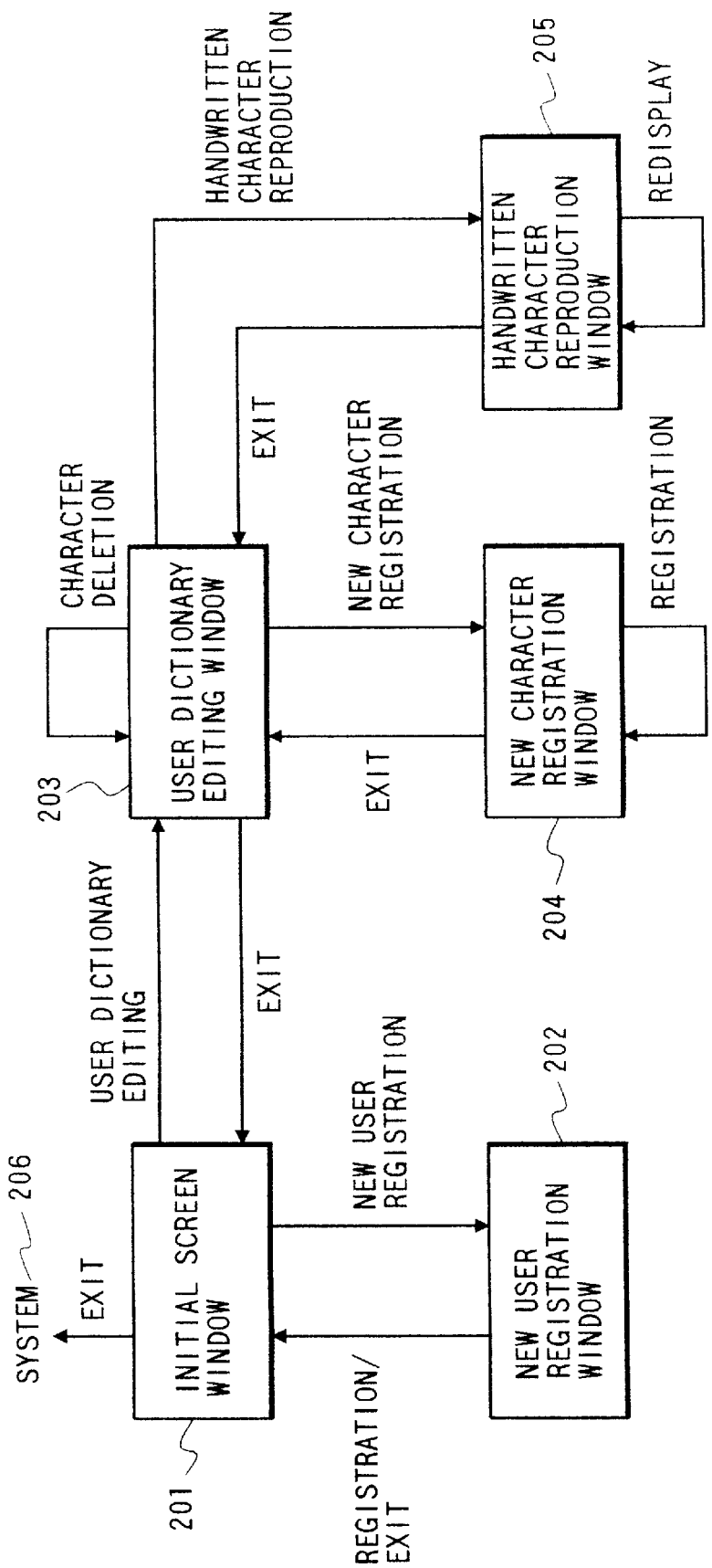
FIG. 3 is a view showing window transitions of the user registration recognition unit in the first embodiment.

FIG. 3 is a view showing window transitions of a user registration application, wherein 201 to 205 indicate windows for executing the above-mentioned functions, and, upon termination of the user registration application, the control is returned to a system 206. Arrows in FIG. 3 indicate the flow of control commands by button controls in the windows. In the following there will be explained such flow and the transition of the windows.

When a "new user registration" command is designated in an initial screen window 201, a new user registration window 202 newly appears as a pop-up window. If a "registration/exit" command is designated therein, this pop-up window is erased and the control returns to the initial screen window 201. If a "user dictionary editing" command is designated in the initial screen window 201, it is erased and a user dictionary editing window 203 newly appears. If a "new character registration" command is designated therein, a new character registration window 204 appears as a pop-up window. The character registering operation in this window can be repeated unless an "exit" command is designated. If the "exit" command is designated after the character registration, the new character registration window 204 is erased and the control is shifted to the user dictionary editing window 203. A "character deletion" command in this window can also be executed plural times. If a "handwritten character reproduction" command is designated, a handwritten character reproduction window 205 appears as a pop-up window. The reproduction starts simultaneously with the display of the window, and can be repeatedly displayed by a "re-display" command. The handwritten character reproduction window is erased by an "exit" command, whereupon the control is returned to the user dictionary editing window. If an "exit" command is designated in the user dictionary editing window, this window is erased and the initial screen window 201 is displayed again. Consequently the user registration application can only be terminated when the "exit" command is designated in the initial screen window 201.

As explained above, the number of windows relating to this user registration application is two when the pop-up window 202, 204 or 205 is displayed, or one when the window 201 or 203 is displayed.

Figure 30:
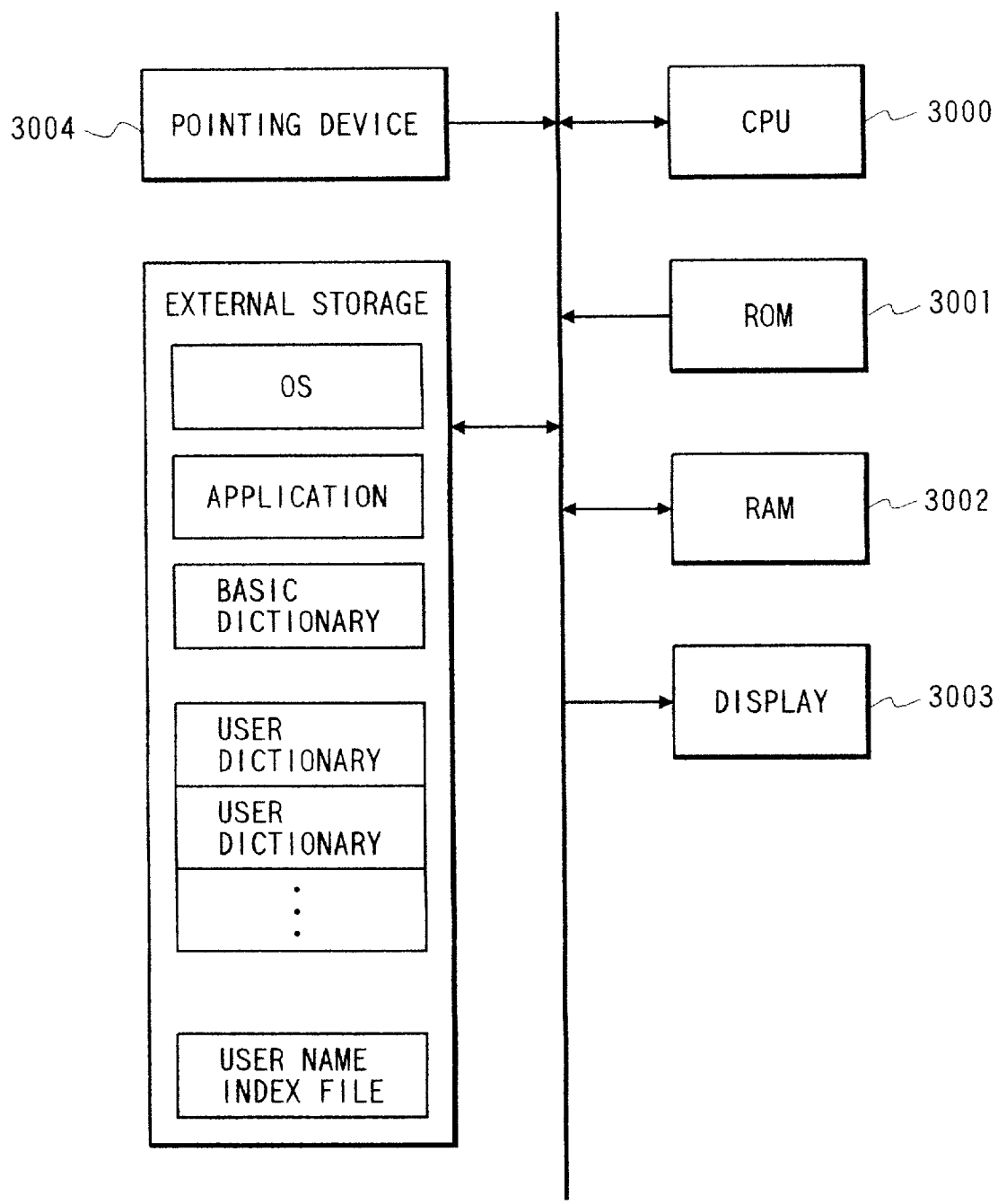
FIG. 30 is a block diagram showing the detailed configuration of an embodiment of the apparatus of the present invention.

FIG. 30 is a block diagram of an actual apparatus realizing the process sections of the above-explained embodiment, wherein provided are a CPU 3000 for controlling the entire apparatus; a ROM 3001 storing a boot program etc.; a RAM 3002 to be used as a work area of the CPU 3000 and for storing the operating system and various applications; a display unit 3003 for displaying, for example, the above-explained windows; and a pointing device 3004 for entering a handwritten character, consisting of a pen type in the present embodiment. The detection of the coordinate position can be executed on any known principle and will not be explained in detail. In practice, a transparent coordinate input board is provided in front of the display screen of the display unit 3003, and the coordinate (or handwritten character) can be entered by pointing the display screen with the pointing pen.

An external memory device 3005, consisting for example of a hard disk, a floppy disk or a magnetooptical disk, is used for storing the operating system, application programs such as character recognition programs (corresponding to the flowcharts to be explained later), the basic dictionary and user dictionaries for the respective users, to be used in the recognition process, and a user name index file containing information for correlating the user names and the user dictionaries.

Figure 4:
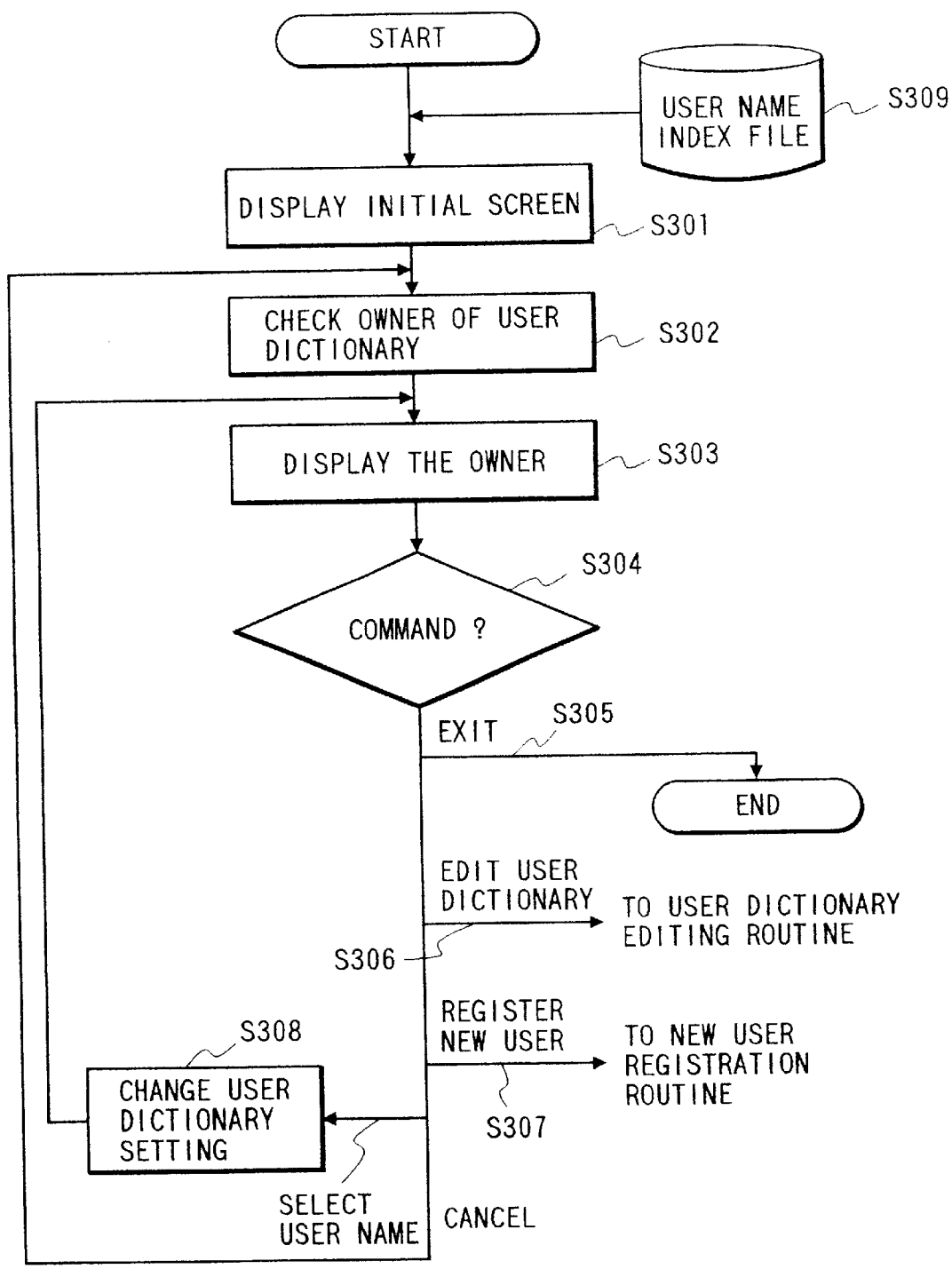
FIG. 4 is a flowchart showing a user registration process in an embodiment of the present invention.

In the following there will be explained, with reference to FIG. 4, the process flow in the embodiment of the present invention.

Figure 18:
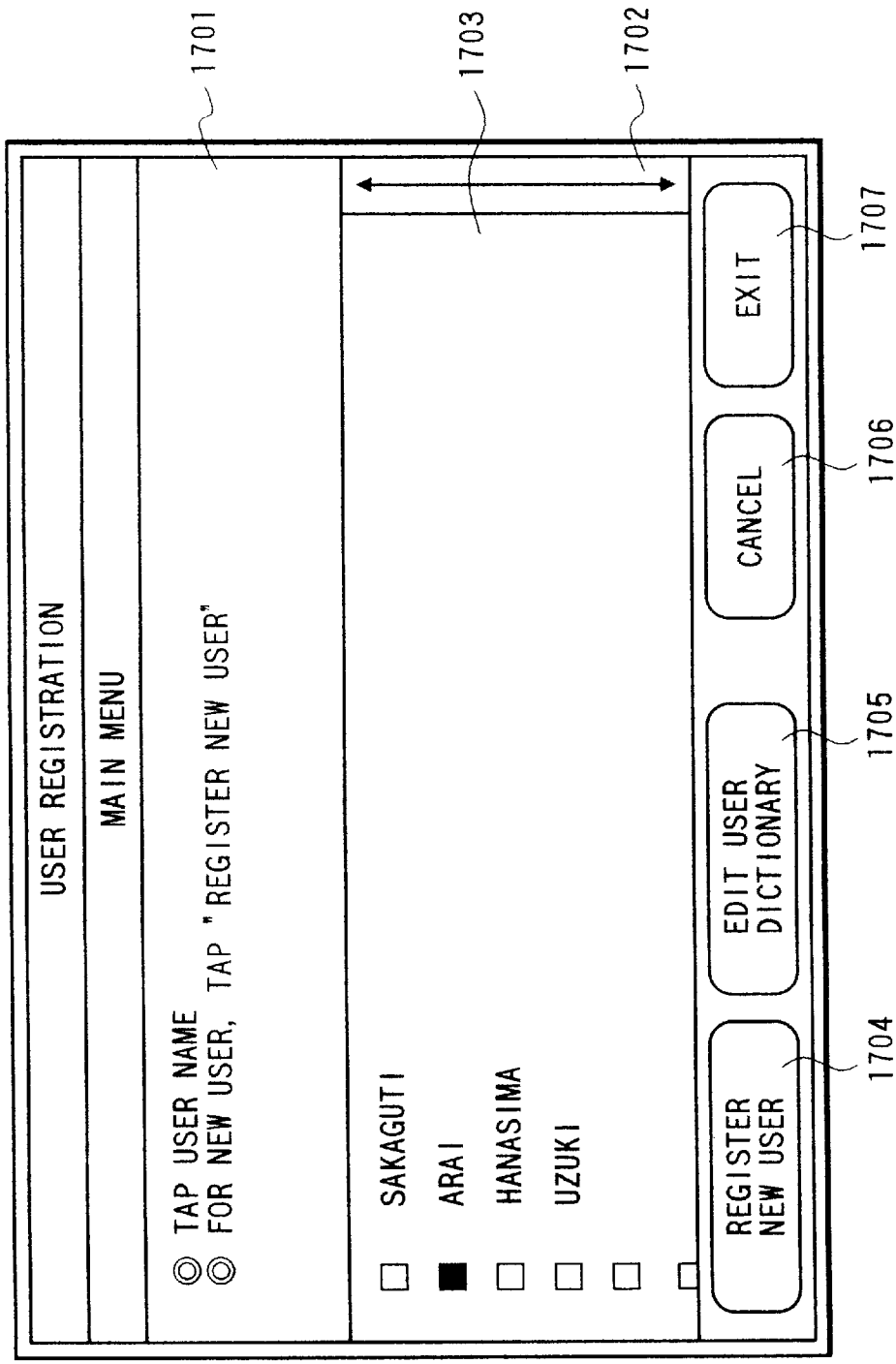
FIG. 18 is a view showing an example of the user registration window in an embodiment of the present invention.

At first a step S301 displays an initial screen as a window shown in FIG. 18, wherein shown are a message display area 1701, an area 1702 for displaying a user name list and a user dictionary owner, a scroll bar 1703 to be used in case the registered users cannot be displayed within the screen, and button s 1704 to 1707 for calling various functions by pen tapping. As explained in the foregoing, the present embodiment employs a pen-type pointing device and a liquid display device, which are integrally constructed. However it is also possible to use the combination of a CRT and a mouse. In such case the pen tapping operation (up-down of pen) is replaced by a clicking of the mouse.

When the user registration application is activated, the step S301 prepares a window, and, in this operation, the registered user names are read from the user name index file 309, which is a disk file consisting of ordinary character codes and which accepts reading and writing. The window shown in FIG. 18 is displayed by the above-explained process.

Then a step S302 judges the owner of the user dictionary set in the system, based on the position of designation (upon detection of pen-down operation) of the pointing device.

When the owner is judged, a step S303 attaches a mark to the user name who is the owner of the user dictionary, in the user name display area 1701. As an example, FIG. 18 illustrates a case where a user whose name is "Arai" is set as the owner. After these processes, the system enters a state of waiting for the instruction by the user (step S304).

By directly selecting a user name with the pointing device, a step S308 request, to the system, a change in the owner of the user dictionary, whereby the setting is altered. Other button commands function in the following manner. By designating a user dictionary editing button 1704 (by designation with the pen and effecting the pen-down operation), a step S306 shifts the control to a user dictionary editing routine. By designating a new user registration button 1705, a step S307 shifts the control to a new user registration routine. Also by designating a cancellation button 1706, there is invalidated the change that has been made in the setting of the user dictionary according to the selection of the user name, and the setting of the user dictionary is returned to a state prior to the actuation of the application. Also by designating an exit button 1707, a step S305 terminates the user registration application and returns the control to the system.

Figure 5:
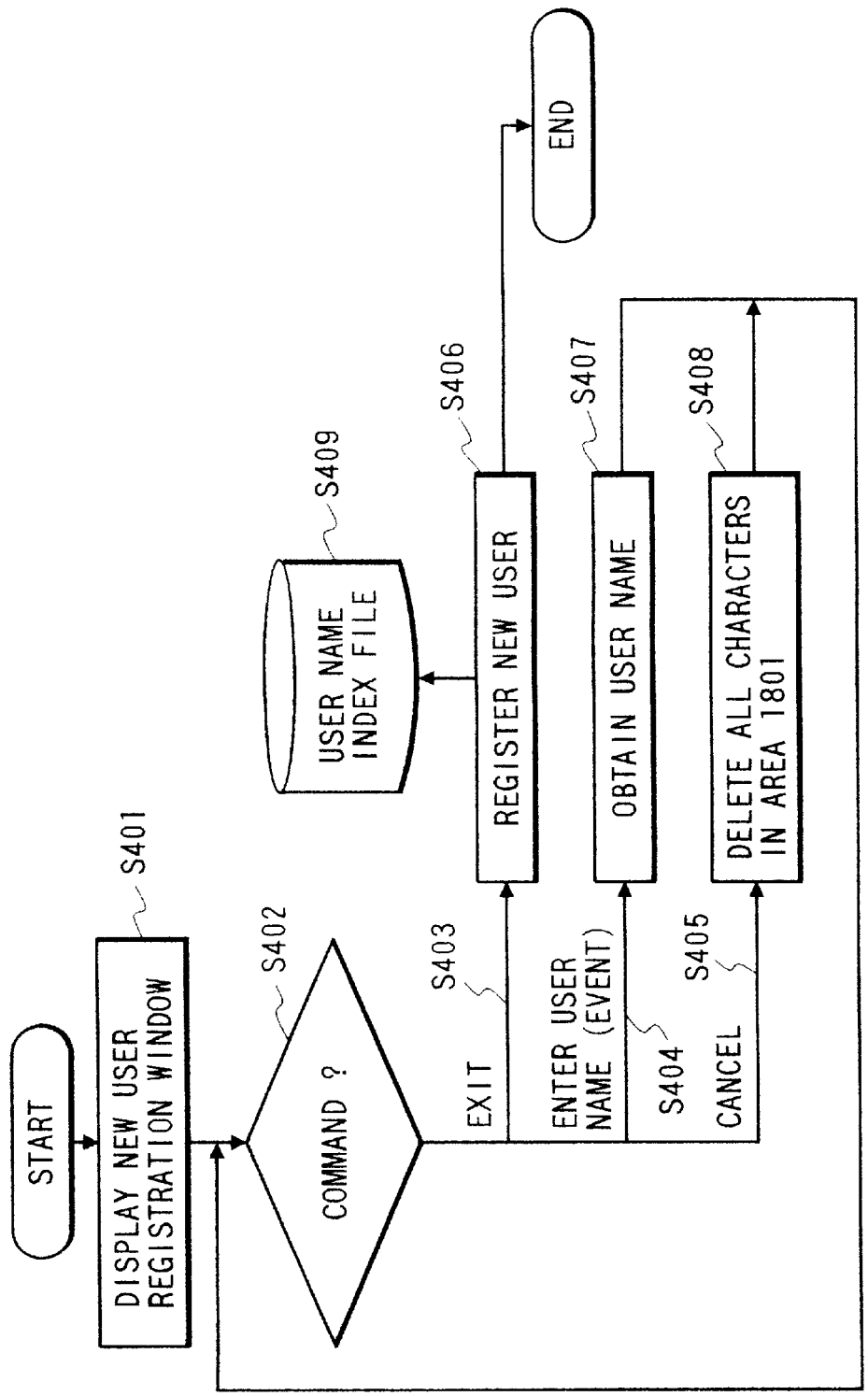
FIG. 5 is a flowchart showing a new user registration process in an embodiment of the present invention.

In the following there will be explained the process flow in the new user registration section, with reference to a flowchart in FIG. 5 and to FIG. 19.

Figure 19:
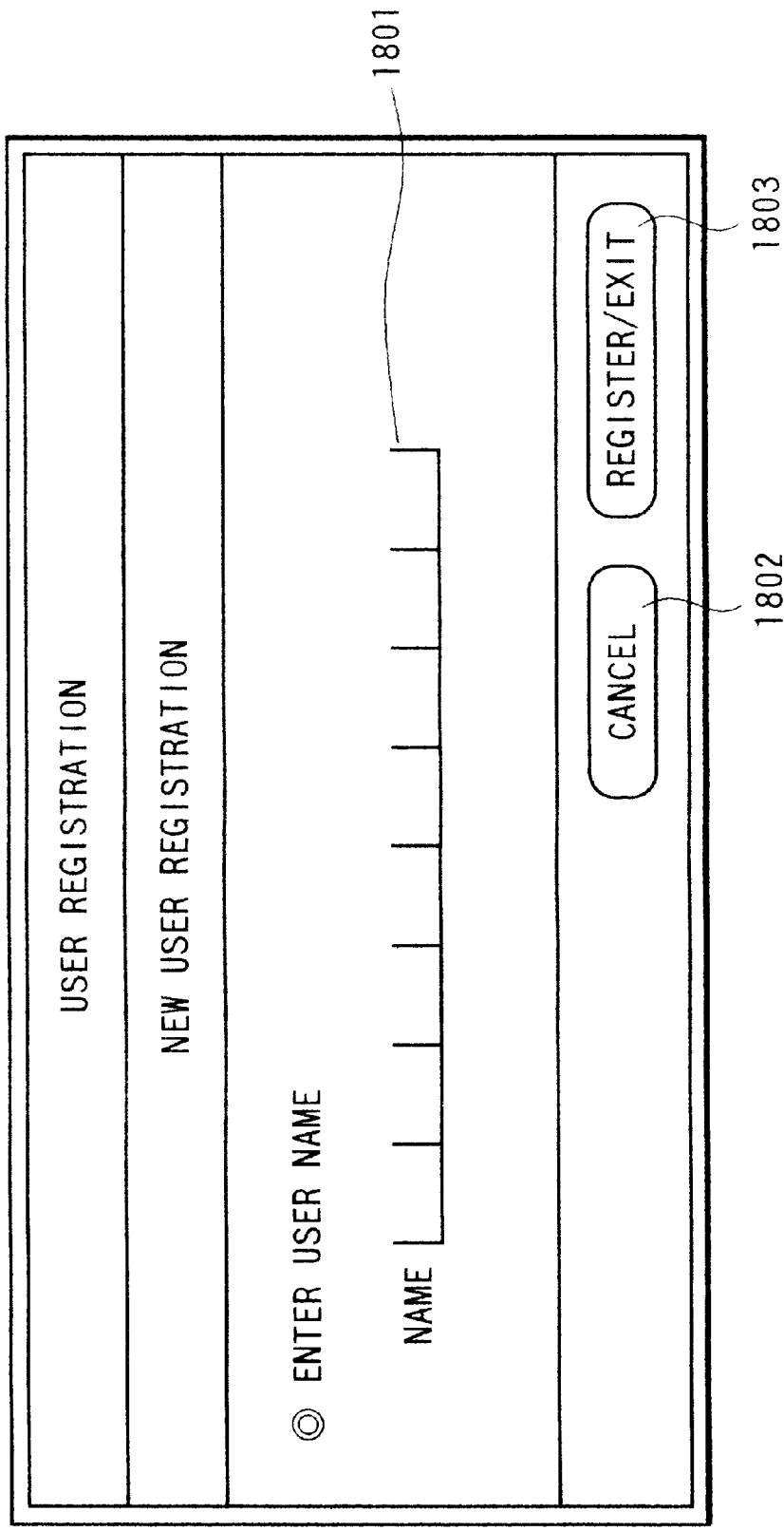
FIG. 19 is a view showing an example of the new user registration window in an embodiment of the present invention.

In FIG. 19 there are shown a user name input area 1801 for entering the user name, a function button 1802 for canceling the input of the user name, and a function button 1803 for registering the entered user name and exiting from this window.

This process is activated by the display of pop-up window shown in FIG. 19 (step S401), in response to the designation of the new user registration button 1704 shown in FIG. 18, and then enters a state of waiting for a command from the user. Thus, the user enters the name in the user name input area 1801, by handwriting with the pen. In response to the detection (step S404) of an event resulting from the pen-down operation, there is called a known recognition routine. The handwriting in the user name input area is subjected an on-line character recognition process by the above-mentioned routine and the character data are converted into character codes (step S407). Since the user cannot be specified at this point, the character recognition is executed with the basic dictionary. When the "registration/exit" button 1803 is designates, the user name entered by conversion into the user name input area is judged as a new user name, and a step S406 additionally registered such new user name in the user name index file S409.

Subsequently the above-mentioned window is erased and the control is returned to the initial screen window.

On the other hand, if the cancellation button 1802 is designated, all the characters entered in the user name input area are erased (step S408), and the system again enters the state of waiting for the user name input command.

In the following there will be explained the process flow in the user dictionary editing section, with reference to a flowchart in FIG. 6 and to FIG. 22, in which shown are a message display area 2101, a registered character list display area 2102, a scroll bar 2103 for scrolling the display of a plurality of registered characters, and buttons 2104 to 2108 for calling functions by pen tapping.

This process is activated in response to the designation of the user dictionary editing button 1705 shown in FIG. 18.

Figure 7:
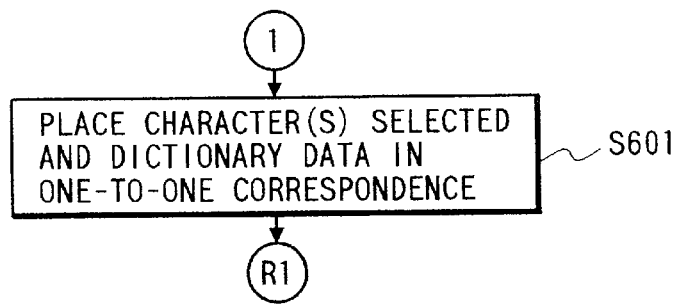
FIG. 7 is a flowchart showing a character selection process in an embodiment of the present invention.

At first a step S512 copies a designated user dictionary and stores it separately, in order to restore the dictionary in case the dictionary editing operation is canceled. Then the user dictionary is opened, and the character codes therein (assumed to be JIS codes but other codes may naturally be adopted) are read into a buffer area secured in advance in the RAM (step S502). Then, a character code correspondence table is prepared (step S601 in FIG. 7) for making one-to-one correspondence between the characters in the user dictionary and the displayed characters. As an example, in case five characters ▲, Δ, ▽, ▼ and * are registered, there is prepared a table as shown in FIG. 24.

In FIG. 24, an area next to the character code is used for storing the relative size of the registered handwritten pattern, corresponding to the character code. The relative size is represented by the size of the entered handwritten pattern relative to an input character frame.

Figure 21A:
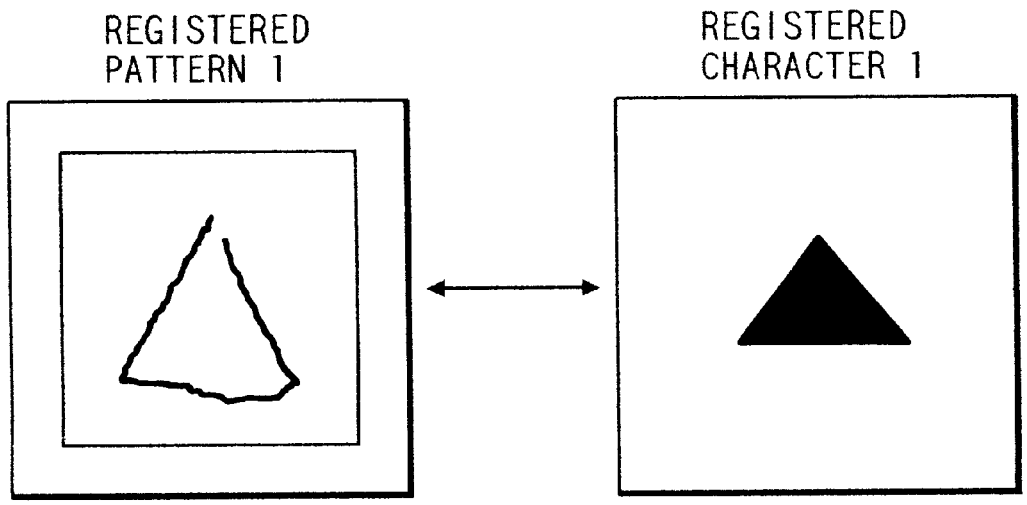
FIGS. 21A and 21B are views showing the relationship between registered patterns and characters outputted as the result of recognition in an embodiment of the present invention.
Figure 21B:
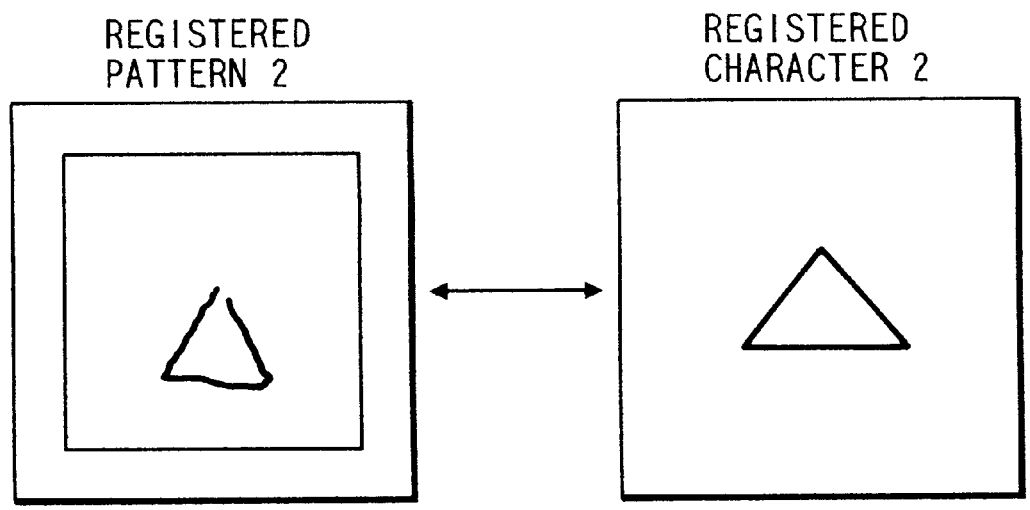

As the relative size information for the registered character 1 or "▲" is recorded as 90%, it is represented as a "triangular trajectory" of a registered pattern 1 with a size of 90% to the frame as shown in FIG. 21A. Also the relative size information for the registered character 2 or "Δ" is recorded as 50%, it is represented as a "triangular trajectory" of a registered pattern 2 with a size of 50% of the frame as shown in FIG. 21B.

This character correspondence table is prepared because, in case there exist plural dictionary character data corresponding to a same character code, the dictionary data cannot be searched in unique manner by the information of the character code only, for the character editing by the "deletion" and "reproduction" commands.

Based on these user registered dictionary data, there is displayed the user dictionary editing window shown in FIG. 22 (step S503).

Figure 6:
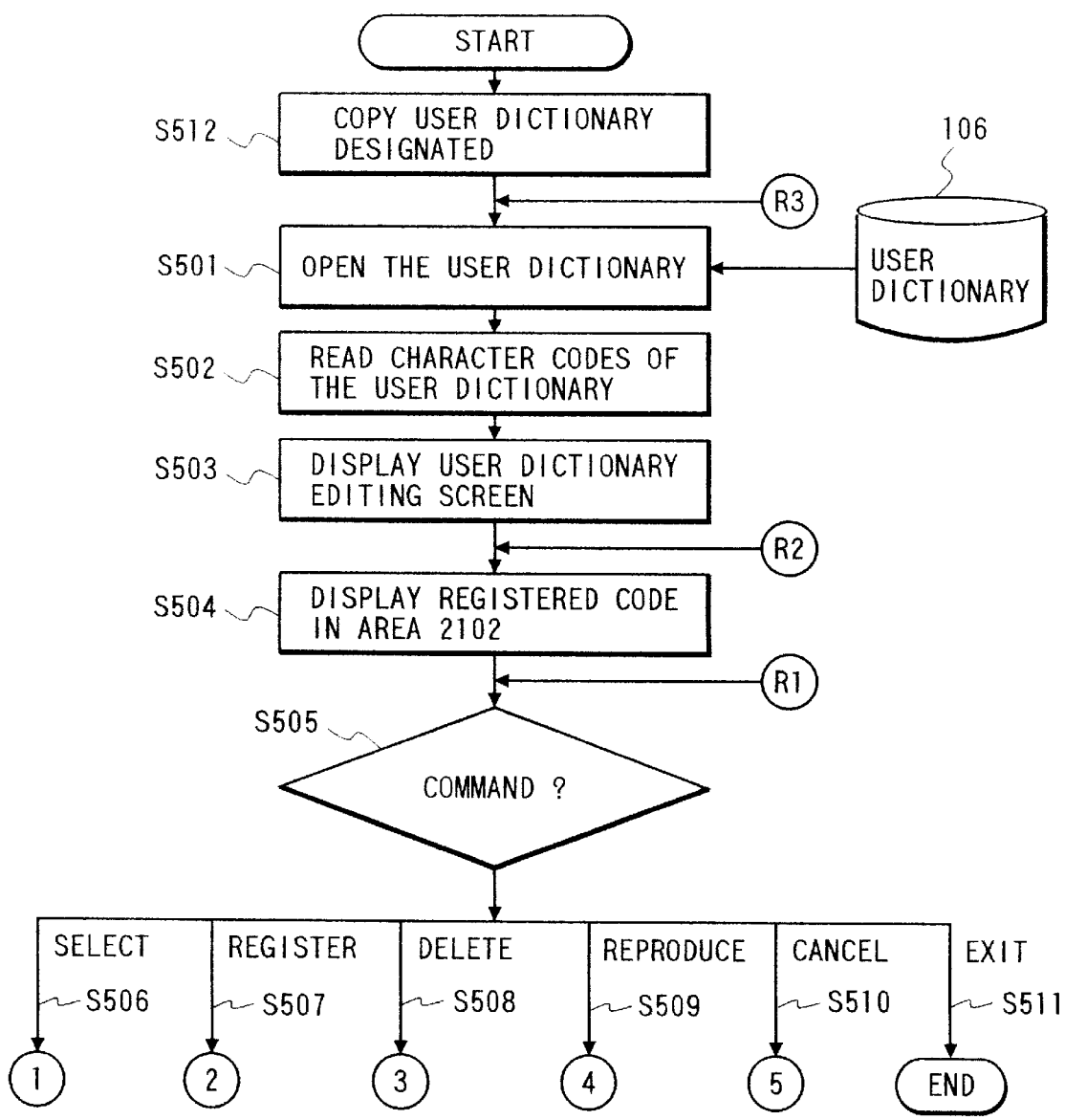
FIG. 6 is a flowchart showing a user dictionary editing process in an embodiment of the present invention.

Then a step S504 in FIG. 6 displays the registered character codes, read in the foregoing operation, in the registered character list display area 2102.

Subsequently the system enters a state of waiting for a command (step S505). When a signal by the pen-down operation is detected in the registered character list display area, the character in the position of the pen-down operation is selected (step S506). From the position information of thus selected character, there is obtained a display number of the character code table, then the position of storage of the dictionary character data in the user dictionary is determined from the display number, and there is obtained data on the dictionary character to be edited.

Figure 8:
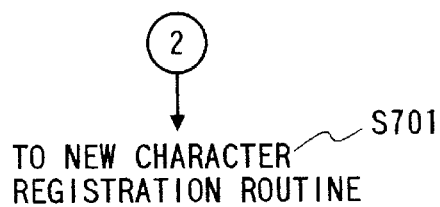
FIG. 8 is a flowchart showing a character registration process in an embodiment of the present invention.
Figure 9:
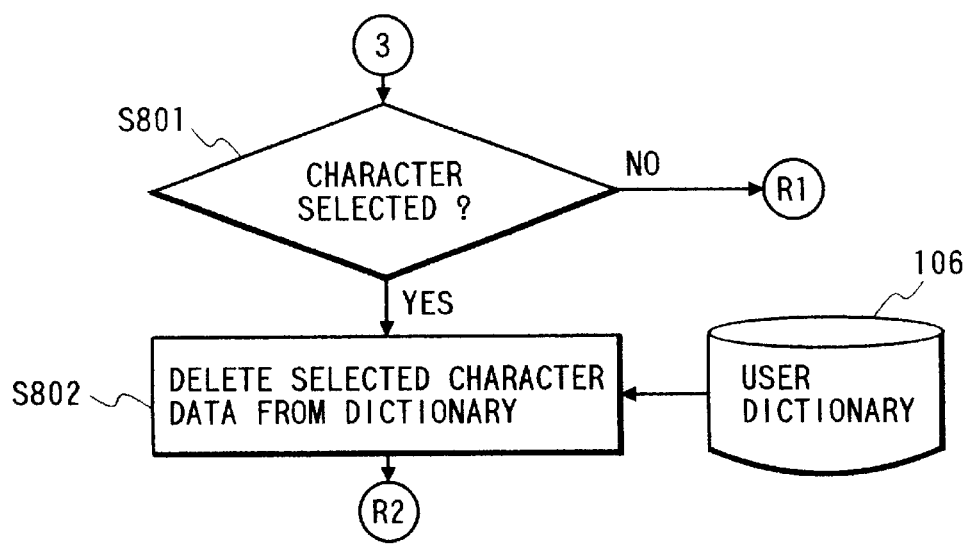
FIG. 9 is a flowchart showing a character deletion process in an embodiment of the present invention.

If the "registration" button 2104 is designated (step S507), the control is shifted to a new character registration routine (step S701 in FIG. 8). If the "deletion" button 2105 is designated (step S509), there is discriminated whether a character in the registered character list display area is selected (step S801 in FIG. 9), and, if not, the system returns to the state of awaiting the command in the step S505. On the other hand, if selected, the storage position of the dictionary data of the character to be deleted is searched by the above-mentioned character code correspondence table. When the storage position is found, the actual character data stored in the user dictionary are deleted (step S802). The character code correspondence table is altered simultaneous with the alteration of the content of the user dictionary, whereby the display in the registered character list display area is renewed (step S504).

Figure 10:
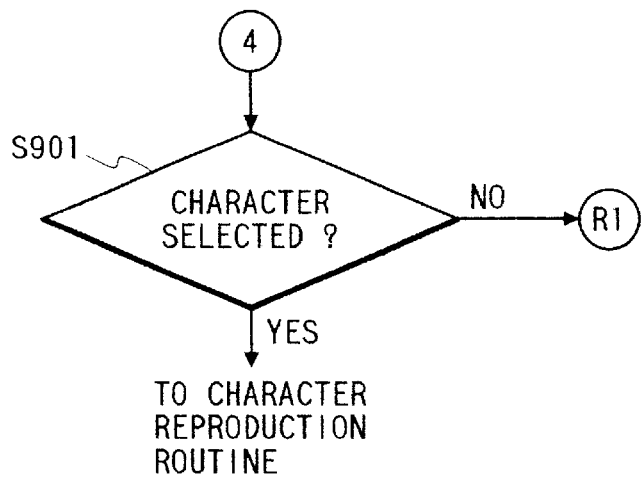
FIG. 10 is a flowchart showing a character reproduction process in an embodiment of the present invention.
Figure 11:
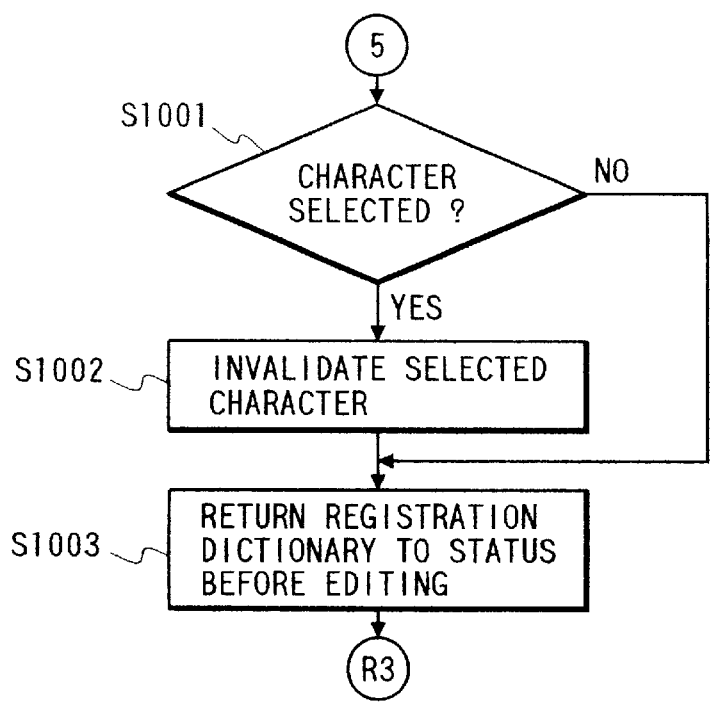
FIG. 11 is a flowchart showing a cancellation process in an embodiment of the present invention.

When the "reproduction button" 2106 is designated (step S509), the control is shifted to a handwriting reproduction routine if a character is selected, but, if not selected, the system again enters the state of awaiting the selection of a character (step S901 in FIG. 10). When the "cancellation" button 2107 is designated (step S510), there is discriminated whether a character in the registered character list display area is selected (step S1001 in FIG. 11), and, if selected, such character is invalidated to attain a state of no selection of the character on the display (step S1002), and the content of the registered dictionary is returned to the state prior to the activation of the dictionary editing window (step S1003). In this manner the re-start of the editing operation is made possible.

Then, when the "exit" button 2108 is designated, the user dictionary editing window is erased and the control is returned to the initial screen section.

Figure 12:
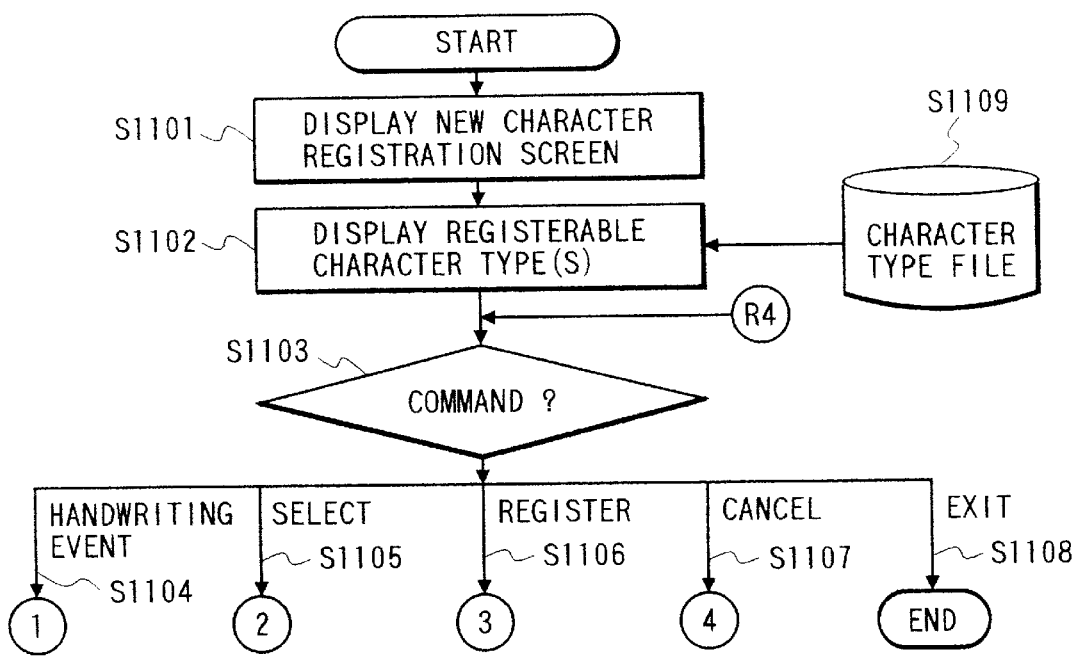
FIG. 12 is a flowchart showing a new character registration process in an embodiment of the present invention.

In the following there will be explained the process flow in the new character registration section, with reference to FIGS. 20, 21A and 21B and a flowchart in FIG. 12.

Figure 20:
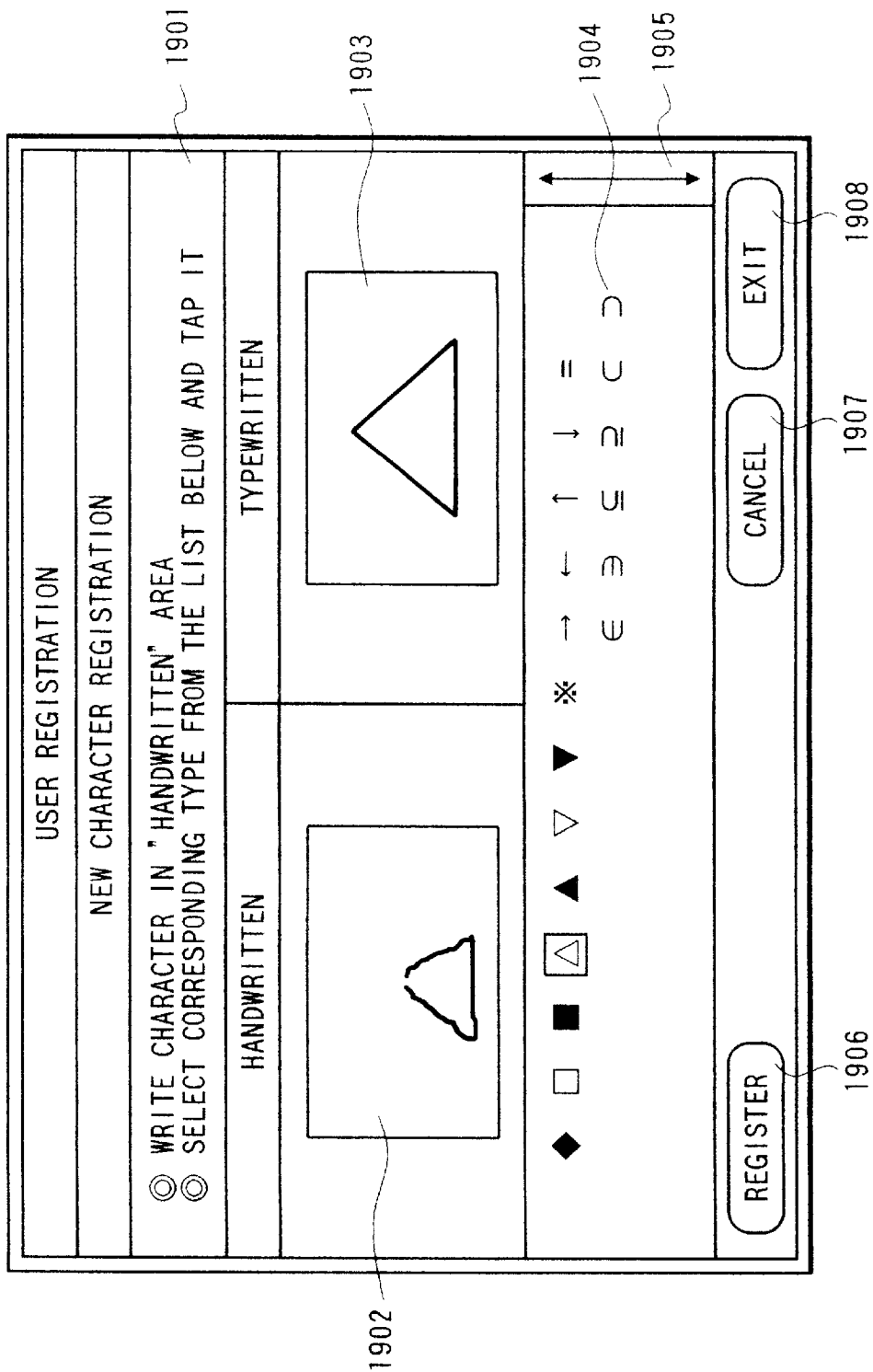
FIG. 20 is a view showing an example of the new character registration window in an embodiment of the present invention.

Referring to FIG. 20, there are shown a message display area 1901, a handwritten character input area 1902, a typewritten character input area 1903, an input code list display area 1904, a scroll bar 1905 for enabling display of plural character codes, and buttons 1906 to 1908 for calling various functions by pen tapping.

The new character registration process is initiated when the "character registration" button 2104 (cf. FIG. 22) is designated in the user dictionary editing section explained above.

At first the framework of the image shown in FIG. 20 is prepared and displayed as a pop-up window (step S1101). The character registration means the assignment of character data, given by the handwriting specific to the user, to the corresponding character code. For this purpose there are required a data input section for obtaining the handwriting data of the user and a character code input section for entering the corresponding code, which are respectively achieved in the handwritten character input area 1902 and the typewritten character input area 1903. The input code list display area 1904 at the bottom center in FIG. 20 display a list of input codes (more exactly a font corresponding to the character codes), and the input is achieved by selecting a desired character from such list. Consequently the input code list has to display the character types that can be registered, and, for this purpose, there is prepared in advance a character type file, storing the registerable character types (step S1109).

Figure 13:
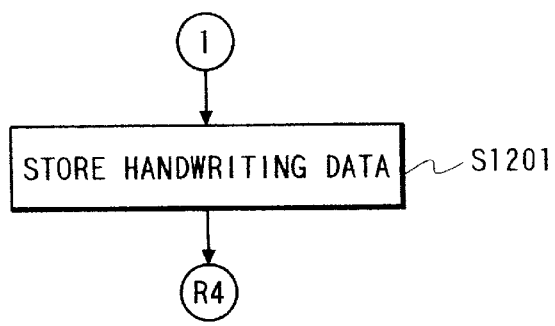
FIG. 13 is a flowchart showing a handwriting data storage process in an embodiment of the present invention.
Figure 14:
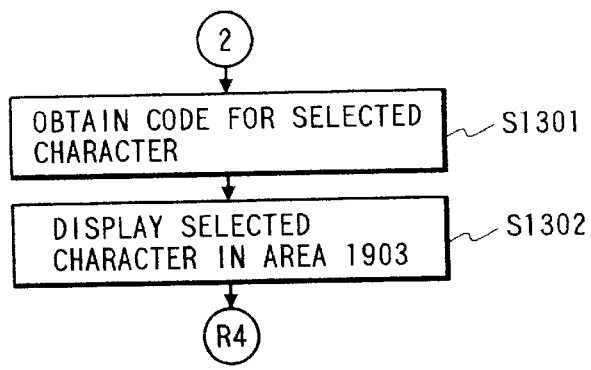
FIG. 14 is a flowchart showing a character selection process for new character registration in an embodiment of the present invention.
Figure 15:
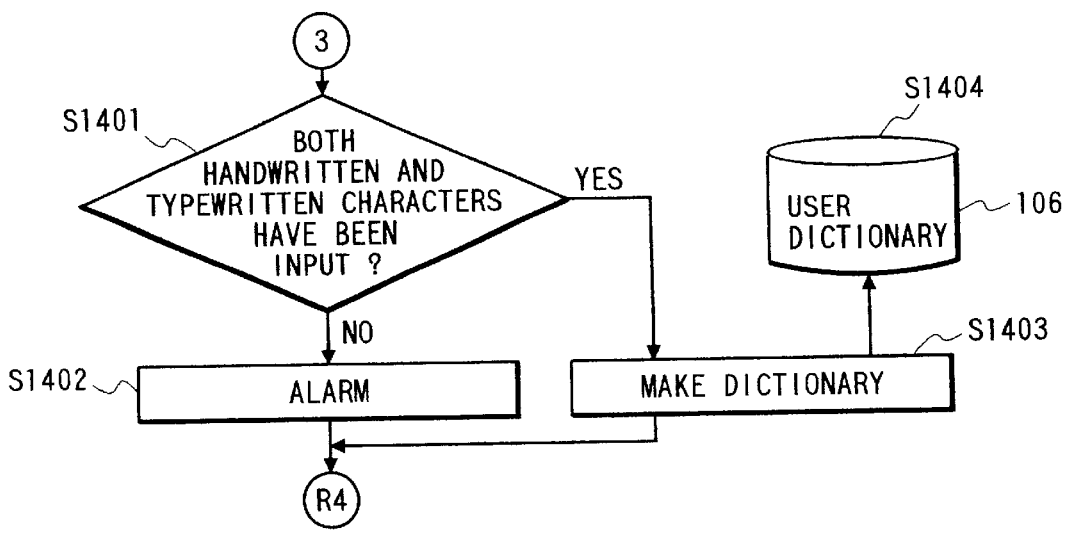
FIG. 15 is a flowchart showing a character registration process for new character registration in an embodiment of the present invention.

There are displayed character types that can be registered, by reading the above-mentioned file (step S1102). After the display, the system awaits the command from the user (step S1103). Upon detection of a pen-down input signal in the "handwritten" area, the handwritten data are stored as a group of two-dimensional coordinates in a buffer area (step S1201 in FIG. 13), and are at the same time drawn in the "handwritten" area. FIG. 20 shows a state where the user has completed the inscription of a symbol Δ. The input of the corresponding character code is achieved, as explained in the foregoing, by selecting a character from the input code list, whereby the corresponding character code is once stored in the buffer area and is thus acquired (step S1301 in FIG. 14). Each selected character is displayed in magnified manner in the "typewritten" area 1903 (step S1302). When the "registration" button 1906 is designated, there is confirmed whether both the handwritten character in the "handwritten" area and the character in the "typewritten" area have been entered, and, if entered, there is initiated the preparation of a recognition dictionary for such character (step S1403).

The preparation of the user registered dictionary is started by determining the relative size of the entered handwritten pattern to the frame. The relative size is represented by percentage, which is calculated by: (height of input pattern× width of input pattern)/(height of character frame×width of character frame)×100. Stated differently there is determined the percentage in area of the circumscribed rectangle of the input character to the input frame.

Then the representative points featuring the strokes are extracted by a known method, such as disclosed in the Japanese Patent Publication No. 62-39460. The present invention can employ any method of extracting the features of the input strokes, such as the method of effecting recognition by the start and end points of the strokes or that by the direction vectors of the handwriting. The registered pattern data consist of thus determined designated character code, relative size, representative points of the strokes and handwritten data for displaying the dictionary pattern.

The user dictionary is prepared newly with or adds such registered pattern data (step S1404). If the input of the handwritten data or the character code is insufficient, there is generated an alarm (step S1402), and the process is so repeated that both the handwritten character data and the character code of the character to be registered are entered.

Figure 16:
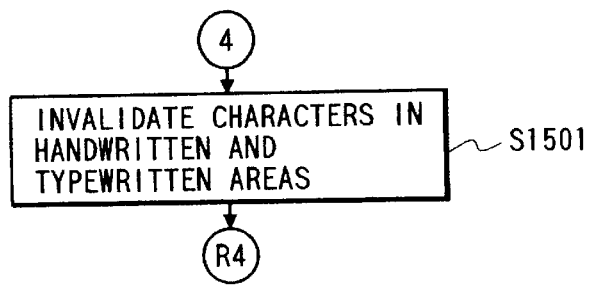
FIG. 16 is a flowchart showing a cancellation process for new character registration in an embodiment of the present invention.

When the "cancellation" button 1907 is designated, the character data and the character code entered in the "handwritten" and "typewritten" areas are invalidated (step S1501 in FIG. 16), thereby enabling input again. FIG. 20 shows a state where a character Δ is selected and entered from the character code list. When the "exit" button 1908 is designated, the new character registration window is erased and the control is shifted to the user dictionary editing section.

Figure 17:
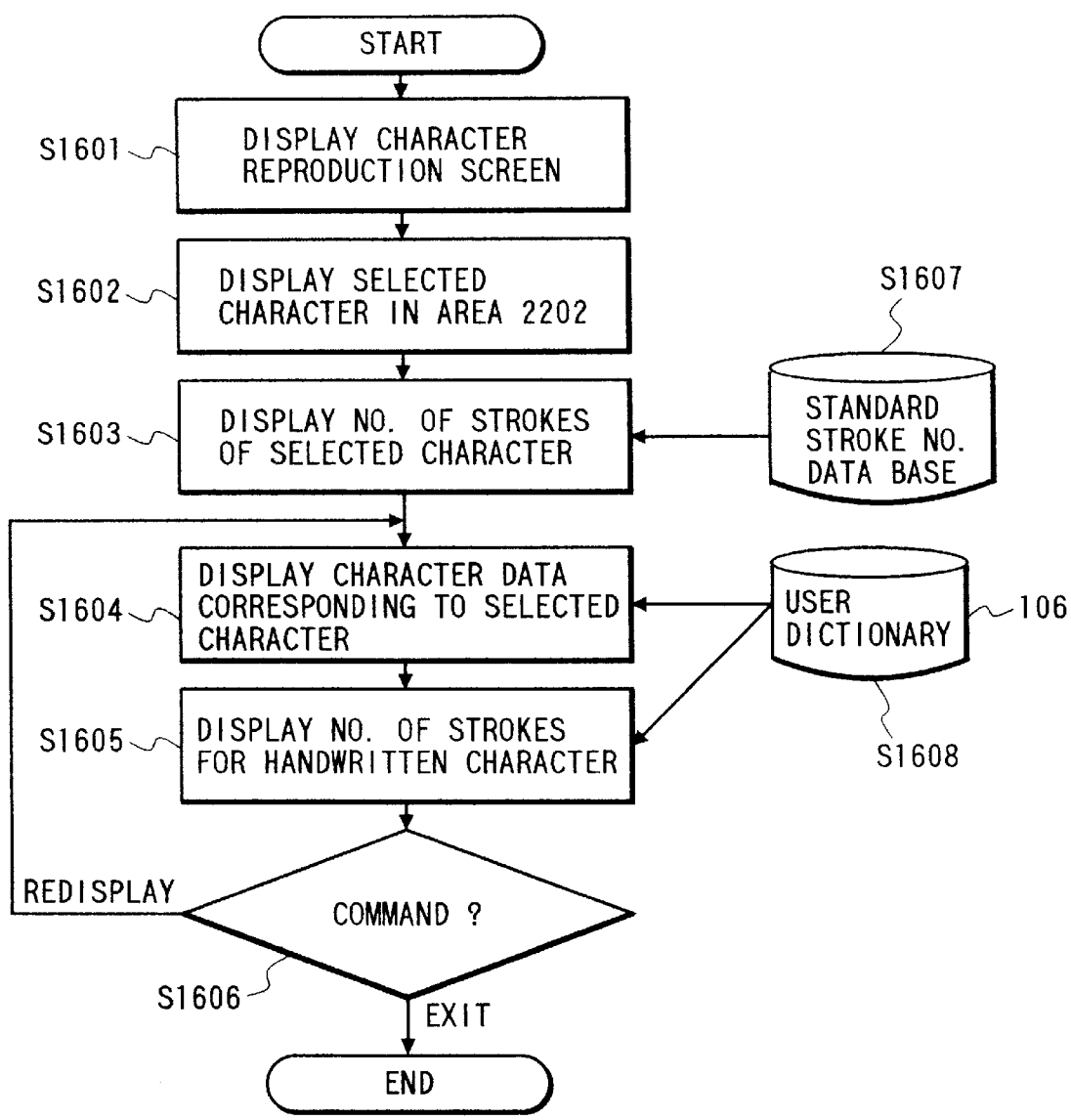
FIG. 17 is a flowchart showing a character reproduction process in an embodiment of the present invention.
Figure 23:
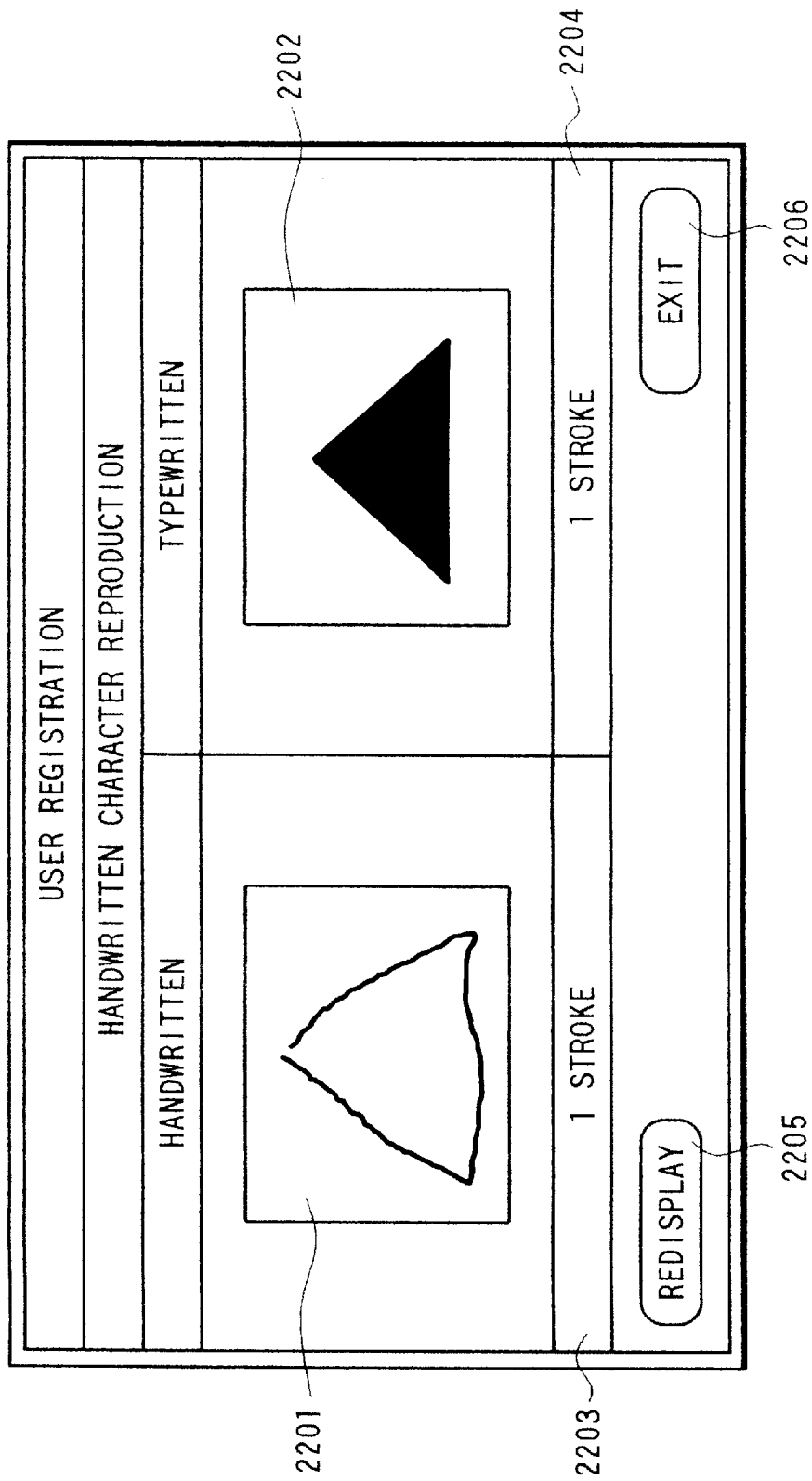
FIG. 23 is a view showing an example of the handwriting reproduction window in an embodiment of the present invention.

In the following there will be explained the process flow in the handwritten character reproduction section, with reference to FIG. 23 and a flowchart in FIG. 17. In FIG. 23 there are shown a handwritten character reproduction area 2201, a typewritten character display area 2202 corresponding to the handwritten character, a handwritten character stroke number display area 2203, a standard stroke number display area 2204 of the object typewritten character, and buttons 2205, 2206 for calling functions by pen tapping.

This process is initiated when the "handwriting character reproduction" button 2106 is designated in the window shown in FIG. 22.

At first the framework of the screen shown in FIG. 23 is prepared and displayed as a pop-up window (step S1601). Since it is already confirmed that a character is selected in the user dictionary editing process, the corresponding typewritten character is displayed in a magnified font in the typewritten character area (step S1602). At the same time the stroke number of the character is displayed (step S1603), by preparing a database of the standard stroke numbers, storing the standard stroke number for each character (step S1607) and searching the corresponding character therein.

The reproduction of the character data in the user dictionary requires a unique extraction of the dictionary data corresponding to the selected character, and such unique extraction is rendered possible by means of the aforementioned character code correspondence table. As the dictionary data of the corresponding character contains coordinate points, together with the pen-down/up information, it is rendered possible to identify the stroke to which each coordinate point belongs. The handwriting is thus drawn by connecting the coordinate points, belonging to a same stroke, with straight lines (step S1604).

Also the number of strokes of the handwritten data is determined by counting the number of pen-down operations and is displayed (step S1605). In a button command operation (step S1606), if the "re-display" button 2205 is designated, the reproduced data are erased and the reproduction of the handwriting is started again, utilizing the dictionary data. If the "exit" button 2206 is designated, the handwritten character reproduction window is erased, and the control is returned to the registered character editing section. FIG. 23 shows a state in which a symbol ▲ with a registration number 001 is selected and the handwriting is reproduced. In the example shown in FIG. 23, the relative size of the user registered data is stored as 90% in the user dictionary 106, as shown in the column 2403 in FIG. 24, the display is given with a size of 90% to the character frame. This is achieved by an ordinary coordinate conversion on the coordinates of the stored handwritten data, so as to obtain a size of 90%.

Now there will be explained, with reference to a flowchart in FIG. 25, the recognition process executed by the recognition means 3 shown in FIG. 1. At first there are entered the handwritten coordinate data of a character, written with a digitizer pen in the character frame.

At first a step S1 determines the width of the character by calculating the difference between the maximum and minimum X coordinates of the handwritten character, also the height of the character by calculating the difference between the maximum and minimum Y coordinates of the handwritten character, then determines the relative size of the character to the character frame according to the equation (height of input pattern×width of input pattern)/(height of character frame×width of character frame)×100, and stores such relative size of the input pattern. In case of input of the registered pattern 1 in FIGS. 21A and 21B, there is stored data 90.

Then a step S2 normalizes the X, Y coordinate values of the input handwritten data to 100×100 by an ordinary method.

More specifically, for input coordinates x1 and y1, the normalized X coordinate is given by:

{(x1−minimum X coordinate of character)×100/width of character} while the normalized Y coordinate is given by:

{(y1−minimum Y coordinate of character)×100/height of character}.

A step S3 effects matching with a dictionary pattern, stored in the dictionary 106 and normalized in the same method as that for the handwritten data in the step S2. The matching algorithm can be a conventional one, such as determining the level of coincidence of the patterns by accumulating the differences between the positions of the representative points of the input handwriting and the dictionary pattern, but other algorithms may also be employed. The level of coincidence becomes 100 (%) if the handwriting is identical in shape with the registered pattern 1. The level of coincidence is 100% if the handwriting is completely similar in shape to the registered pattern, and 0% if the handwriting is completely dissimilar in shape to the registered pattern. As the registered patterns 1 and 2 are identical in the shape of the handwriting, the level of coincidence to the registered pattern 2 becomes 100% if that to the registered pattern 1 is 100%. It is not possible, therefore, to distinguish whether the input pattern is more similar to the registered pattern 1 or 2, by the matching process up to the step S3.

Then a step S4 compares the relative size information of the candidates of the registered patterns, showing high levels of coincidence with the handwritten data, with the relative size of the input pattern, thereby rearranging the candidates. The comparison of the relative size information is made for the candidates showing levels of coincidence higher than 50%. The comparison of the relative size is not executed if the level of coincidence does not exceed 50%, since the result of recognition is inaccurate. More precisely, the level of coincidence obtained in the step S3 is compared with a threshold value 50, and, for the candidate character showing a level of coincidence not exceeding 50%, the sequence does not proceed to a step S4 but jumps to a step S5. Since the candidate registered patterns 1 and 2 show the level of coincidence of 100% or in excess of 50%, in the step S3, a step S4 executes comparison of the relative size "90" of the input pattern, stored in the step S1, with the relative size information of the registered patterns 1 and 2. It is to be noted that the above-mentioned threshold value is not limited to 50%. Since the relative size information of the registered pattern 1, stored in the dictionary 106, is "90" while the relative size of the input pattern, determined in the step S1, is also "90", the difference therebetween is "0" so that the level of coincidence with the registered pattern 1 is regarded as 100. On the other hand, as the relative size information of the registered pattern 2 is "50" while the relative size of the input pattern is "90", the difference therebetween is 40 and the level of coincidence to the registered pattern 2 is regarded as 100−40=60. As explained above, the step S4 determines the similarity of the candidate character, which is the percentage (%) obtained by subtracting the difference (%) in relative size from the similarity (%) determined in the step S3. Based on the process of the step S4, a step S5 ranks the registered pattern 1 ▲ as the first candidate and the registered pattern 2 Δ as the second candidate, for the result of recognition.

Thus the step S5 sorts the candidates in the descending order of similarity determined in the step S4, and releases thus determined candidates to the exterior (or a lower process), for display on the display screen. There may be released the candidate character of the first rank only, or the candidate characters of a predetermined number. Also the released candidates may be associated with the respective similarities, for utilization in the subsequent process.

Though the above-explained recognition process, it is rendered possible to register plural different character codes by varying the size of a same handwritten pattern, and to easily output plural characters by inputting a character in the same size as in the registering operation.

The comparison in the steps S3 and S4 is made only with the dictionary patterns stored in the user dictionary 106, but not with the dictionary patterns in the basic dictionary 4. However it is naturally possible to obtain a similar effect on the dictionary patterns stored in the basic dictionary 4 by applying the process of the present invention thereto.

The preparation of the windows and the detection of signals in the present specification can be achieved by a known technology. In the foregoing description, the pointing device consists of a pen, but similar operations can naturally be attained with a mouse. Consequently the input of the handwritten character is not limited to the mode in the foregoing embodiment.

Second Embodiment

The following apparatus for recognizing the character registered by the user can be realized by adding positional information of the registered character relative to the frame, in addition to the relative size information in the foregoing embodiment.

FIG. 26 shows the concept of configuration of the user registered character recognition apparatus featuring the present invention, wherein pattern registration means 11 for detecting the feature, size and position of the handwritten data, is provided in the new character registration section 104 in FIG. 2. The pattern registration means 11 normalizes the input handwritten data for constituting data of a recognizing dictionary, extracts and stores the feature points of the character in a user dictionary, according to a known technology. In addition it determines the size and positional information of the handwriting entered by the user as relative positional and size data, relative to the input character frame at the registering operation, and stores such data in the user dictionary 12 in FIG. 26.

In the user dictionary 12 to be used by the above-mentioned user registration means, the pattern of a character is represented by handwritten data of normalized strokes, a position and a size of such handwritten data relative to the input character frame, and a character code. The handwritten data are composed of data of the representative points to be used by the recognition means 13 and handwriting reproduction data to be used by the display means 14.

The recognition means 13 executes recognition, utilizing the user registered dictionary registered by the user registration means and the basic dictionary. The recognition is executed for example by a conventional algorithm utilizing the positional difference between the representative points of each stroke, but the result of recognition is released to the exterior, together with the relative size and positional information.

In FIG. 26, a basic dictionary 4 stores the character data registered in advance with standard writing method.

Figure 27A:
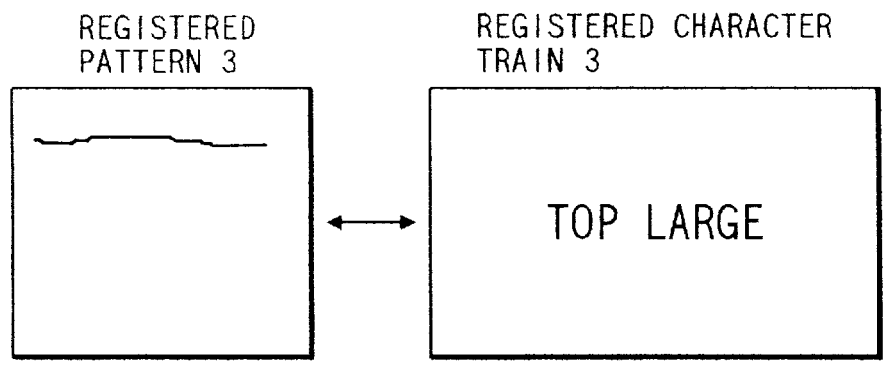
FIGS. 27A to 27C are views showing the relationship between registered patterns and character trains outputted as the result of recognition in the second embodiment.
Figure 27B:
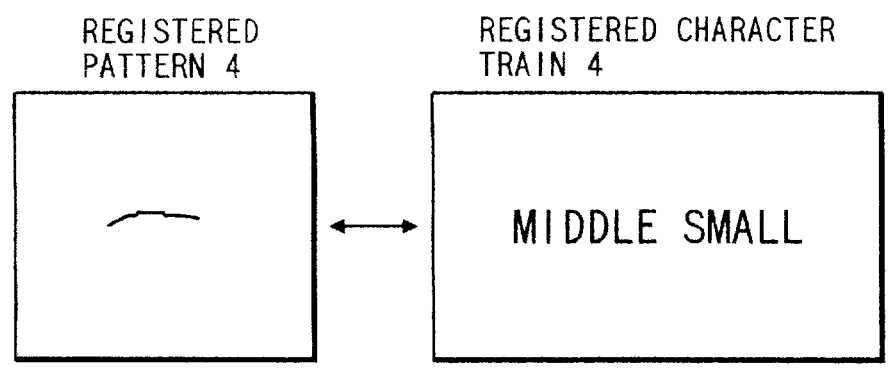
Figure 27C:
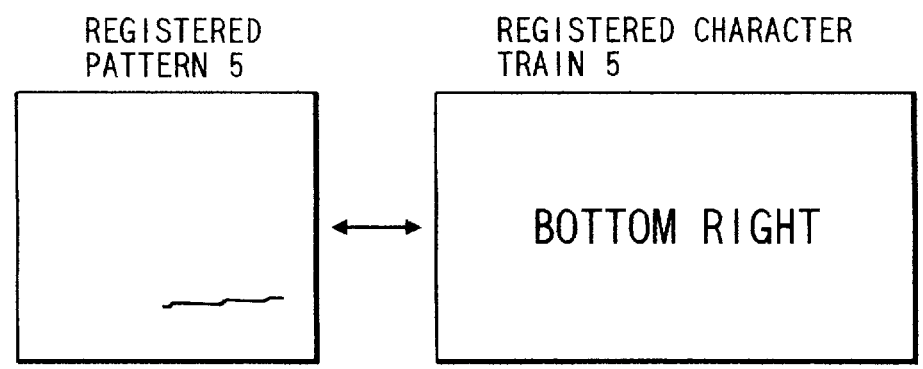

FIGS. 27A to 27C show the relationship between the registered patterns and the character train outputted as a result of recognition. A registered pattern 3 shown in FIG. 27A is a large horizontal line written in the upper part of the character frame, and the character train corresponding thereto are "TOP LARGE". A registered pattern 4 shown in FIG. 27B is a small horizontal line written in the central part of the character frame, and the character train corresponding thereto are "MIDDLE SMALL". A registered pattern 5 shown in FIG. 27B is a small horizontal line written in the bottom right part of the character frame, and the character train corresponding thereto are "BOTTOM RIGHT". In this manner there can be registered two or more characters for a single handwritten character.

FIG. 28 is a view showing the structure of the user dictionary 12 shown in FIG. 26. A registered pattern is composed of a memory area 2801 for the registration number of the registered pattern, a memory area 2802 for the character codes of a character train outputted as the result of recognition, a memory area 2803 for the information indicating the position and the size, and a memory area 2804 for the normalized handwritten data of the registered pattern. As an example, the registered pattern 3 shown in FIGS. 27A to 27C is registered as a pattern of the registration number 3 in the user dictionary 106. The registration number memory area 2801 stores the registration number 3. The character train memory area 2802 stores codes (3E65, 4267) representing the character patterns "TOP LARGE". The position/size information memory area 2803 stores the relative minimum X coordinate, the relative minimum Y coordinate, the relative maximum X coordinate and the relative maximum Y coordinate of the pattern 3 relative to the character frame. More specifically, the relative minimum X coordinate is given by (minimum X coordinate of character/maximum X coordinate of frame)/100. Similarly;

relative minimum Y coordinate=(minimum Y coordinate of character/maximum Y coordinate of frame)/100 relative maximum X coordinate=(maximum X coordinate of character/maximum X coordinate of frame)/100 relative maximum Y coordinate=(maximum Y coordinate of character/maximum Y coordinate of frame)/100.

As the X, Y-coordinates in the present embodiment have the original point (0, 0) at the upper left corner of the character frame, the registered pattern 3 is memorized as (5, 5, 90, 6).

Also for the registered pattern 3, the memory area 2804 stores the coordinate data of the normalized horizontal line.

Figure 29:
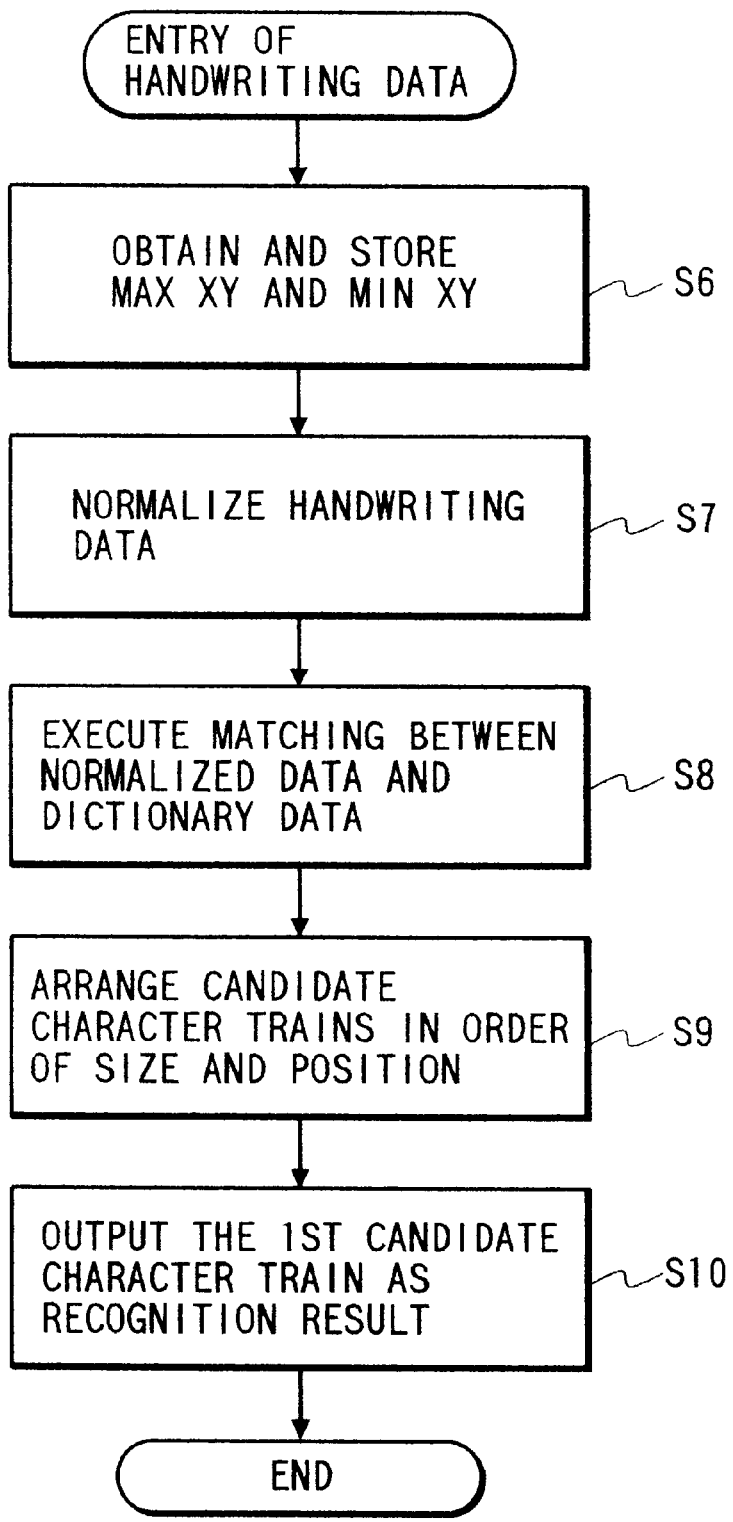
FIG. 29 is a flowchart showing a recognition process in the second embodiment.

In the following there will be explained the recognition process, with reference to a flowchart in FIG. 29.

The recognition process is initiated by the input of handwritten data of a character. A step S6 stores the position and size information of the character, consisting of the relative minimum and maximum X, Y-coordinates relative to the frame, by:

relative minimum X coordinate=(minimum X coordinate of input character/maximum X coordinate of frame)/100 relative minimum Y coordinate=(minimum Y coordinate of input character/maximum Y coordinate of frame)/100 relative maximum X coordinate=(maximum X coordinate of input character/maximum X coordinate of frame)/100 relative maximum Y coordinate=(maximum Y coordinate of input character/maximum Y coordinate of frame)/100.

Therefore, the registered pattern 4 is memorized as (30, 50, 60, 50).

Figure 25:
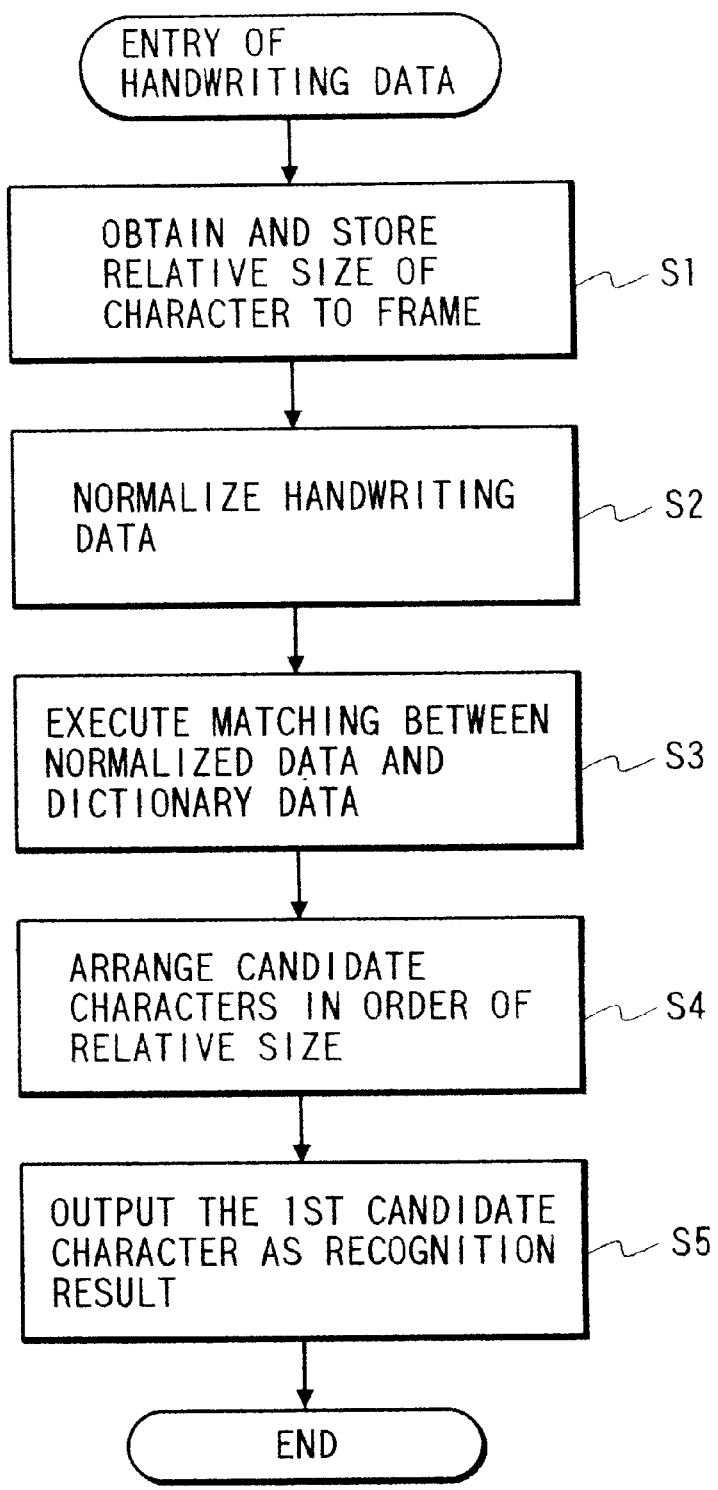
FIG. 25 is a flowchart showing a recognition process in the first embodiment.

A step S7 normalizes the handwritten character data in a similar manner as in the step S2 in the flowchart in FIG. 25.

A step S8 matches the normalized handwritten data with the handwritten data of the user dictionary, by a method as in the step S3 in the flowchart in FIG. 25. As the input pattern is similar to the registered pattern 4, the registered patterns 3, 4 and 5 show a level of coincidence of 100% so that the input pattern cannot therefore be recognized in this step.

Then a step S9 compares the relative size/position information of the input pattern with that of the candidate registered patterns showing a high level of coincidence, and rearranges the candidates accordingly.

In this comparison, the difference in the size/position information is determined by {(difference between relative minimum X coordinate of input pattern and relative minimum X coordinate of registered pattern)+(difference between relative minimum Y coordinate of input pattern and relative minimum Y coordinate of registered pattern)+(difference between relative maximum X coordinate of input pattern and relative maximum X coordinate of registered pattern)+(difference between relative maximum Y coordinate of input pattern and relative maximum Y coordinate of registered pattern)}/4.

The final result is given by subtracting the difference in the size and position information from the level of coincidence of the handwritten pattern.

As the relative size/position information of the input pattern memorized in the step S6 is (30, 50, 60, 50) while that of the registered pattern 3 is (5, 5, 90, 6), the difference therebetween is given by {(30−5)+(50−5)+(90−60)+(50−6)}/4=36. Since the level of coincidence of the handwritten pattern is 100, the final result for the registered pattern 3 is 100−36=64.

Also as the registered pattern 4 is represented by (30, 50, 60, 50), the difference is given by {(30−30)+(50−50)+(60−60)+(50−50)}/4=0. Since the level of coincidence of the handwritten pattern is 100, the final result for the registered pattern 4 is 100−0=100.

Also as the registered pattern 5 is represented by (50, 90, 90, 90), the difference is given by {(50−30)+(90−50)+(90−60)+(90−50)}/4=32.5. Since the level of coincidence of the handwritten pattern is 100, the final result for the registered pattern 5 is 100−32.5=67.5.

Consequently the first candidate for the result of recognition is the registered pattern 4 "MIDDLE SMALL", the second candidate is the registered pattern 5 "BOTTOM RIGHT", and the third candidate is the registered pattern 3 "TOP LARGE".

Thus a step S10 releases "MIDDLE SMALL" as the result of recognition, for example for display on the display unit of the recognition apparatus.

As explained in the foregoing, the second embodiment utilizes not only the size of the character but also the position thereof for the recognition process, thereby providing different results of recognition for input patterns that are same in the handwritten form only. It is therefore rendered possible to switch input of plural characters, even with a simple line, by changing the size and position thereof, and a handwritten character recognizing apparatus easy to use can therefore be provided.

Also the foregoing embodiments of the present invention can be realized by the supply of a program to a general-purpose apparatus from the outside.

Stated differently, the present invention can be attained by mounting a memory medium, storing a program, on an apparatus or a system and by reading such program into a memory, so that the present invention is naturally applicable to the memory medium itself storing such program, such as a floppy disk, a CD-ROM, a memory card or a detachable hard disk.

Figure 31:
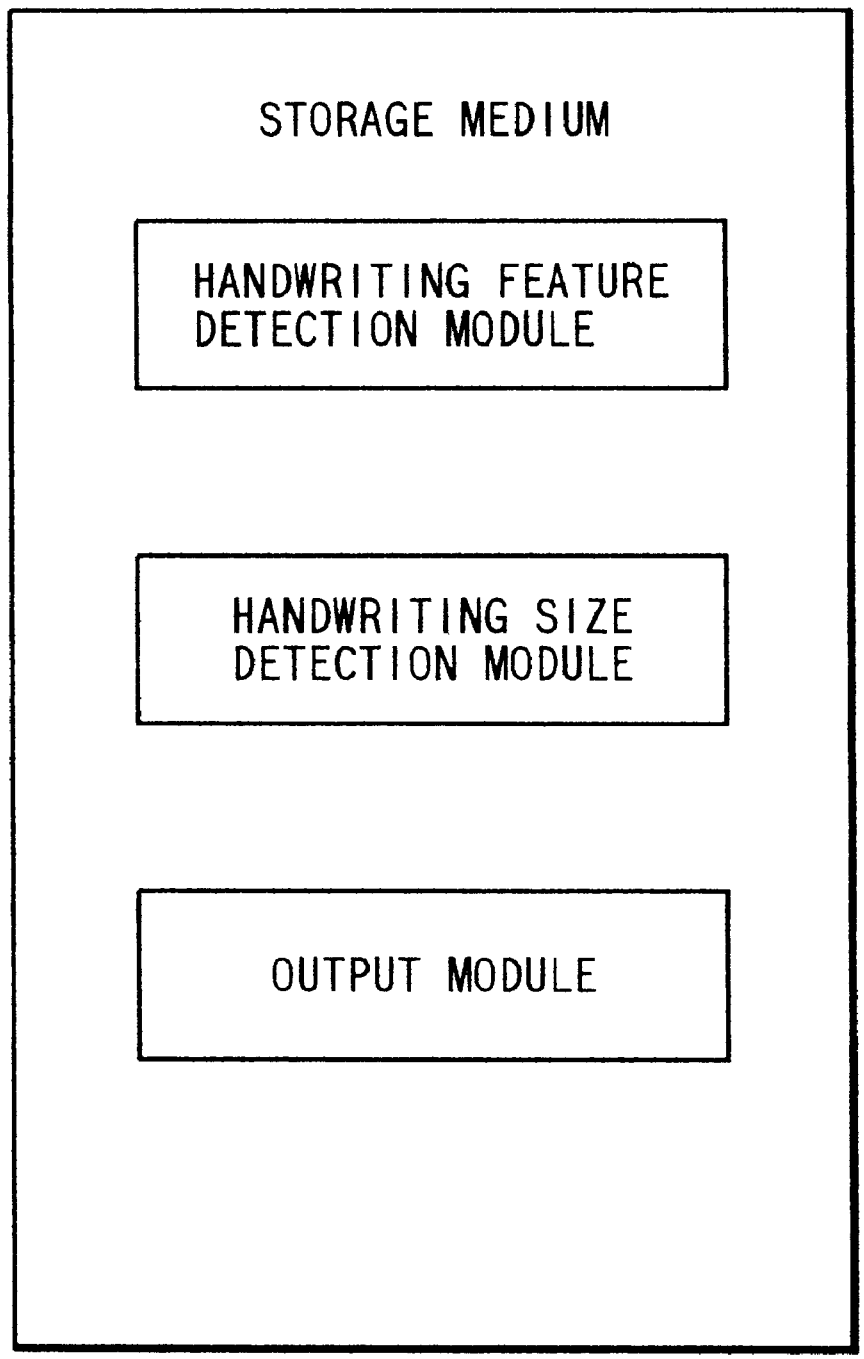
FIG. 31 is a view of storage modules in a memory medium in an embodiment of the present invention.

In such case such memory medium stores a program corresponding to the flowchart explained in the foregoing first or second embodiment, and at least including modules shown in FIG. 31.

More specifically, there are included at least a handwriting feature detection module for detecting the feature amount of the input handwriting information, a handwriting size detection module for detecting the size information of the input handwriting information, and an output module for referring to a dictionary, storing in advance the feature amount of the handwriting information, the size information thereof and the character/symbol information to be outputted in mutually corresponding manner, effecting the matching between the feature amount and the size information of the detected handwriting information and those in the dictionary, and outputting the corresponding character/symbol information.

The present invention is applicable not only to a system composed of plural equipment but also to an apparatus consisting solely of a single equipment. Also, as explained in the foregoing, the present invention is naturally applicable to a case where it is attained by the supply of a program to a system or an apparatus. In such case, the memory medium storing such program constitutes the present invention, and the system or the apparatus functions in a predetermined manner, by reading the program from such memory medium into such system or apparatus.

What is claimed is:

1. A pattern recognition apparatus for processing an input pattern for recognition, utilizing a dictionary which registers both feature and size data corresponding to character symbols, said apparatus comprising:

detection means for detecting feature and size data of the input pattern for recognition;

read out means for reading out from the dictionary the feature and size data;

comparison means for comparing both the feature and size data detected by said detection means with both the feature and size data read out from the dictionary, and for determining both a first value, the first value representing the similarity between the feature data detected by said detection means and the feature data read out from the dictionary, and a second value, the second value representing the similarity between the size data detected by said detection means and the size data read out from the dictionary; and output means for outputting the character symbol judged to be similar to said input pattern based on a third value calculated from the first value and the second value.

2. An apparatus according to claim 1, further comprising means for registering, in said dictionary, the feature and the size data extracted from the input pattern for registration and the character symbol to be output in mutually corresponding manner.

3. An apparatus according to claim 1, wherein said size data includes position information.

4. An apparatus according to claim 1, wherein the size of the input pattern is represented by the ratio of the area of a circumscribed rectangle of the input pattern to the entire area of a predetermined input frame into which the input pattern is to be input.

5. An apparatus according to claim 3, wherein the position information of the input pattern is composed of position information of each stroke relative to a predetermined input frame into which the input pattern is to be input.

6. An apparatus according to claim 1, wherein the third value is calculated based on a sum of the first value and the second value, and the third value is taken as the similarity between the feature and size data detected by said detection means and the feature and size data read out from the dictionary.

7. An apparatus according to claim 1, wherein the feature data of said input pattern for recognition is the feature in shape obtained by normalizing the input.

8. An apparatus according to claim 1, wherein said comparison means includes:

first comparison means for determining the first value by comparing the feature data detected by said detection means with the feature data of the character symbol read out from the dictionary; and second comparison means for determining the second value by comparing the size data detected by said detection means with the size data of the character symbol read out from the dictionary in case the first value of the character symbol exceeds a predetermined threshold value.

9. An apparatus according to claim 1, further comprising input means for entering said input pattern for recognition in the form of a train of coordinate points.

10. An apparatus according to claim 9, wherein said input means is a pointing device.

11. An apparatus according to claim 1, wherein said output means is a display unit capable of displaying the character symbol as a pattern.

12. A pattern recognition method for processing an input pattern for recognition, utilizing a dictionary which registers both feature and size data corresponding to character symbols, said method comprising the steps of:

detecting feature and size data of the input pattern for recognition;

reading out from the dictionary the feature and size data;

comparing both the feature and size data detected in said detection step with both the feature and size data read out from the dictionary, and for determining both a first value, the first value representing the similarity between the feature data detected by said detection means and the feature data read out from the dictionary, and a second value, the second value representing the similarity between the size data detected by said detection means and the size data read out from the dictionary; and outputting the character symbol judged to be similar to said input pattern based on a third value calculated from the first value and the second value.

13. A method according to claim 12, further comprising a step of registering, in said dictionary, the feature data of the input pattern for registration, the size data extracted from the input pattern for registration and the character symbol to be output in mutually corresponding manner.

14. A method according to claim 12, wherein said size data includes position information.

15. A method according to claim 12, wherein the size of the input pattern is represented by the ratio of the area of a circumscribed rectangle of the input pattern to the entire area of a predetermined input frame into which the input pattern is to be input.

16. A method according to claim 14, wherein the position information of the input pattern is composed of position information of each stroke relative to a predetermined input frame into which the input pattern is to be input.

17. A method according to claim 12, wherein the third value is calculated based on a sum of the first value and the second value, and the third value is taken as the similarity between the feature and size data detected by said detected feature and the feature and size data read out from the dictionary.

18. A method according to claim 12, wherein the feature data of said input pattern for recognition is the feature in shape obtained by normalizing the input pattern.

19. A method according to claim 12, wherein said comparison step includes:

a first comparison step for determining the first value by comparing the feature data detected by said detection step with the feature of the character symbol read out from the dictionary; and a second comparison step for determining the second value by comparing the size data detected by said detection means with the size data of the character symbol read out from the dictionary in case the first value of the character symbol exceeds a predetermined threshold value.

20. A method according to claim 12, wherein said input pattern for recognition is entered in the form of a train of coordinate points.

21. A method according to claim 12, wherein said input pattern for recognition is entered by a pointing device.

22. A method according to claim 12, wherein said character symbol is displayed as a pattern on a display unit.

23. A memory medium storing process codes to be read into a memory of a pattern recognition apparatus and to be executed thereby, with the process codes comprising:

a first detection step of detecting the feature data of an input pattern for recognition;

a second detection step of detecting the size data of the input pattern for recognition;

a step of referring to a dictionary storing in both advance feature and size data corresponding to each character symbol; and a step of comparing both the feature and size data detected in said first and second detecting steps with both the feature and size data read out from the dictionary, and for determining both a first value, the first value representing the similarity between the feature data detected by said detection step and the feature data read out from the dictionary, and a second value, the second value representing the similarity between the size data detected by said detection step and the size data read out from the dictionary; and a step of outputting the character symbol judged to be similar to said input pattern based on a third value calculated from the first value and the second value.

24. A pattern recognition apparatus according to claim 1, wherein said dictionary is registered handwritten data for displaying a dictionary pattern.

25. A pattern recognition apparatus according to claim 1, wherein the feature data is shape data which represents a pattern shape.

26. A pattern recognition apparatus according to claim 1, wherein the registered size data is the relative size of the input pattern to an input frame.

27. A pattern recognition apparatus according to claim 1, wherein the registered size data is the percentage amount of size of the input pattern to an input frame.

28. A pattern recognition method according to claim 12, wherein said dictionary is registered handwritten data for displaying a dictionary pattern.

29. A pattern recognition method according to claim 12, wherein the feature data is shape data which represents a pattern shape.

30. A pattern recognition method according to claim 12, wherein the registered size data is the relative size of the input pattern to an input frame.

31. A pattern recognition method according to claim 12, wherein the registered size data is the percentage amount of size of the input pattern to an input frame.

32. A memory medium according to claim 23, wherein said dictionary is registered handwritten data for displaying a dictionary pattern.

33. A memory medium according to claim 23, wherein the feature data is shape data which represents a pattern shape.

34. A memory medium according to claim 23, wherein the registered size data is the relative size of the input pattern to an input frame.

35. A memory medium according to claim 23, wherein the registered size data is the percentage amount of size of the input pattern to an input frame.

36. A memory medium according to claim 23, wherein the size of the input pattern is represented by the ratio of the area of a circumscribed rectangle of the input pattern to the entire area of a predetermined input frame into which the input pattern is to be input.

37. A memory medium according to claim 23, further comprising a step of entering the input pattern for recognition in the form of a train of coordinate points.

38. A memory medium according to claim 37, wherein the entering step is performed via a tablet.

* * * * *

UNITED STATES PATENT AND TRADEMARK OFFICE
CERTIFICATE OF CORRECTION

PATENT NO. : 6,421,461 B1  
DATED : July 16, 2002  
INVENTOR(S) : Tsunekazu Arai et al.

It is certified that error appears in the above-identified patent and that said Letters Patent is hereby corrected as shown below:

<u>Title page,</u>  
Item [57], ABSTRACT,  
Line 5, "features" should read -- feature --.

<u>Column 5,</u>  
Line 42, "button s" should read -- buttons --.

<u>Column 6,</u>  
Line 32, "an" should read -- to an --;  
Line 38, "designates," should read -- designated, --; and  
Line 40, "registered" should read -- registers --.

<u>Column 8,</u>  
Line 27, "display" should read -- displays --.

<u>Column 11,</u>  
Line 32, "Though" should read -- Through --.

<u>Column 12,</u>  
Lines 27 and 30, "are" should read -- is --; and  
Line 33, "are" should read -- is --.

Signed and Sealed this

Eleventh Day of February, 2003

JAMES E. ROGAN  
*Director of the United States Patent and Trademark Office*